US011200740B1

(12) United States Patent
Samuel

(10) Patent No.: US 11,200,740 B1
(45) Date of Patent: Dec. 14, 2021

(54) SYSTEMS FOR GENERATING IMAGE-BASED USER INTERFACES

(71) Applicant: AMAZON TECHNOLOGIES, INC., Seattle, WA (US)

(72) Inventor: Sunil Samuel, Madrid (ES)

(73) Assignee: AMAZON TECHNOLGOIES, INC., Seattle, WA (US)

(*) Notice: Subject to any disclaimer, the term of this patent is extended or adjusted under 35 U.S.C. 154(b) by 0 days.

(21) Appl. No.: 17/012,632

(22) Filed: Sep. 4, 2020

(51) Int. Cl.
*G06T 19/00* (2011.01)
*G06F 3/0481* (2013.01)
*G06Q 30/06* (2012.01)

(52) U.S. Cl.
CPC ........ *G06T 19/003* (2013.01); *G06F 3/04815* (2013.01); *G06Q 30/0643* (2013.01)

(58) Field of Classification Search
None
See application file for complete search history.

(56) References Cited

U.S. PATENT DOCUMENTS

| | | | | |
|---|---|---|---|---|
| 2011/0115728 A1* | 5/2011 | Kwak | ................... | G06F 3/0488 345/173 |
| 2012/0113216 A1* | 5/2012 | Seen | ................... | H04N 13/239 348/38 |
| 2013/0285964 A1* | 10/2013 | Kang | ................... | G06F 3/0481 345/173 |
| 2014/0149920 A1* | 5/2014 | Wang | ................... | G06F 3/0487 715/783 |
| 2015/0121242 A1* | 4/2015 | Kwon | ................... | G06F 16/435 715/739 |
| 2016/0054845 A1* | 2/2016 | Takahashi | ............. | G06F 3/0486 345/173 |
| 2016/0350522 A1* | 12/2016 | Chi | ................... | G06F 3/04845 |
| 2017/0068857 A1* | 3/2017 | Lee | ................... | H04M 1/72403 |
| 2017/0134605 A1* | 5/2017 | Ju | ................... | H04N 5/232939 |
| 2018/0088751 A1* | 3/2018 | Han | ................... | G06F 3/04842 |
| 2020/0053293 A1* | 2/2020 | Lee | ................... | H04N 5/23222 |
| 2020/0304626 A1* | 9/2020 | Phillips | .................. | G07F 9/023 |

* cited by examiner

Primary Examiner — Toan H Vu
(74) Attorney, Agent, or Firm — Lindauer Law, PLLC

(57) ABSTRACT

User interfaces that prioritize the presentation of images over other content are generated to facilitate user understanding of available items, especially in cases where a user is accessing a website using a mobile device or other device having a limited display area. When an interface containing images and non-image content is presented, such as a search result output, the user may select an image view in which each image is presented in association with a category of the image, while excluding output of non-image content. User interaction with a particular image may be used to access the non-image content associated with that image. In some cases, user interaction with an image may cause presentation of a three-dimensional model of the depicted item, which may be rotated and magnified through additional user input.

20 Claims, 14 Drawing Sheets

SYSTEMS FOR GENERATING IMAGE-BASED USER INTERFACES

BACKGROUND

User interfaces may be used to present various types of content. Presentation of a large amount of content or different types of content in a single user interface may result in a negative user experience, especially for users of mobile devices or other devices having a limited display area. For example, viewing a large amount of content in a user interface for a smartphone screen may require a significant amount of scrolling or navigation by the user, while portions of the display area may be occupied by information of low interest or utility to the user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1A:
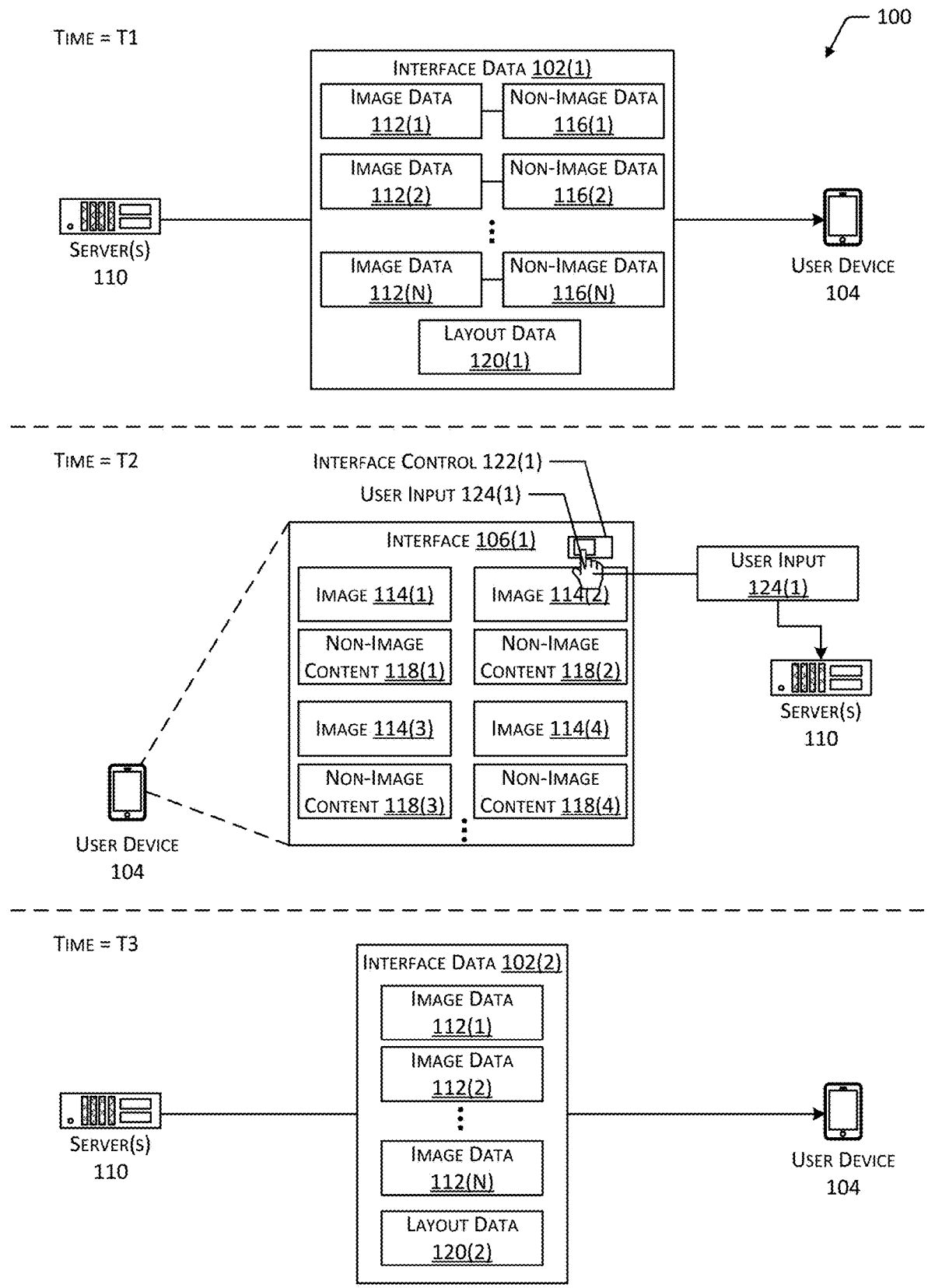
FIGS. 1A and 1B depict an implementation of a system for providing interface data to a user device to cause presentation of interfaces that prioritize image data and other information of interest.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Certain types of output presented in a user interface, such as a list of search results, may include a large amount of content. For example, a search result output in response to a search query associated with an online store may include images of multiple items. Each image may be adjacent to non-image data, such as text indicating an item name, price, user ratings and reviews, and other information. Presentation of a long list of search results that includes multiple types of information interspersed throughout a display area may create a negative user experience. For example, a user of a mobile device, or another device having a limited display area, must often scroll or navigate a significant amount to view all of the content. Additionally, a user may encounter difficulty attempting to understand the context of displayed information due to the small amount of information that may be displayed at a single time. In some cases, a user may benefit from presentation of a smaller amount of content, and limited types of content.

Described in this disclosure are techniques for displaying output in a manner that prioritizes presentation of images, while excluding or suppressing output of other data. For example, when a search query is received from a user device, first interface data may be determined that represents a search output responsive to the query. The first interface data may include images associated with various items. Each image may be associated with non-image data, such as text. Each image may also be associated with a category, such as categories associated with popular items, items featured by a certain brand or manufacturer, items featured by an online store, and so forth. For example, the first interface data may be used to present a first interface in which the search results are displayed in a list. Continuing the example, the search results may sequentially present images of items, each image being adjacent to text indicating the item name, price, and other information. To view information regarding additional items, a user may scroll the list, select buttons or links associated with different pages of the list, and so forth. In cases where a limited amount of content may be displayed at one time, a user may become fatigued after scrolling through the search results and may lose attention or interest in the content. Additionally, after a heading or other indication of a category has scrolled out of view, the user may no longer remain aware of the context associated with a portion of the content that is currently displayed.

The first interface may include a control, such as a button, switch, selector, and so forth, which may be associated with a second interface that prioritizes presentation of images.

For example, in response to user input associated with the control, second interface data may be determined based on the first interface data. In other implementations, the second interface may be presented initially without presenting the first interface, based on a user preference or configuration, or based on a default setting. The second interface data may cause presentation of a second interface in which each image of the first interface is presented in association with an indication of the category associated with each image, while non-image data such as text is excluded from presentation. In one implementation, the second interface may present images in a grid arrangement associated with a category. For example, a heading that includes an indication of a category may be presented above a grid having a selected size, such as three images by three images. In other implementations, other arrangements of images may be presented. Each image of the second interface may have the same dimensions, or one or more images may have different dimensions. For example, a particular image within the second interface may have greater dimensions than other images based on characteristics of an item depicted in the image, such as a count of purchases of the item, a count of positive user reviews, and so forth. In some implementations, as user input is received to scroll the images within the grid, the images may scroll while the heading remains in a stationary orientation within the second interface. As a result, a user may remain aware of the category and context of the images that are shown without scrolling the indication of the category out of view. When the user scrolls beyond the end of the images associated with the category, the heading indicating the category may be moved to a background of the second interface, and continued scroll inputs may begin to scroll through images associated with a subsequent category in a similar manner. Presentation of images while excluding text or other non-image data may enable a user to view a larger amount of content at a single time, and in cases where a user is primarily interested in visual content, such as when purchasing items from an online store, presentation of images may retain the user's interest and attention.

If user input indicating a particular image in the second interface is received, third interface data may be determined. The third interface data may cause presentation of a third interface that includes at least a portion of the text or other non-image data associated with the indicated image. For example, selection of an image may cause text indicating an item name or price to be presented, text indicating user ratings or reviews of the item, and in some cases, an enlarged view of the selected image or one or more additional images of the item. In some implementations, the third interface may be presented within a frame presented with the second interface. For example, at least a portion of the second interface may be visible and accessible to user input while the third interface is presented. Continuing the example, input to the second interface outside of the frame may be used to navigate to the second interface. Therefore, the information presented in the third interface may be viewed without requiring the user to navigate away from the second interface or lose the ability to view or select images of additional items. In some implementations, the third interface may be at least partially transparent, and one or more portions of the second interface located behind the third interface may be at least partially visible due to the transparency.

In some implementations, the third interface may include additional data regarding the depicted item, such as additional images, text that was not included in the first interface, information regarding ratings or reviews of the item, information regarding available colors, sizes, or other variations of the item, and so forth. User input interacting with the additional information may enable presentation of further information. For example, selection of information regarding a user review may cause presentation of text or images associated with the user review. As another example, selection of an available color or other variation of an item may cause presentation of images that depict the selected color or variation of the item. As yet another example, the third interface may include navigational links to access one or more additional interfaces that present information regarding the item, controls to initiate a purchase transaction for the item, and so forth.

In some implementations, the third interface data may include information regarding additional items. For example, a third interface presenting information regarding a first item may also include one or more images of other items related to the first item. If user input indicating an image of a second item is received, additional interface data for presenting one or more images of the second item and non-image data associated with the image(s) may be determined and used to cause presentation of an additional interface.

In some implementations, when user input selecting an image is received, a model representing a three-dimensional view of the depicted item may be presented. For example, multiple images that depict different views of the item may be used to generate a model that may be presented in different orientations. In response to user input to the model, the model may be rotated or a level of magnification associated with the model may be changed to present the item in a different orientation and enable the user to view different parts of the item. One example system for generation of a model representing a three-dimensional view of an item is Vanilla-tilt.js, which is available at GitHub and implemented in JavaScript under an MIT license. In some implementations, when the model is presented, a region of the third interface that does not include the model may be determined. Other information associated with the item, such as text or other non-image data, may be presented in one or more regions of the third interface that do not include the model. Additionally, in some implementations, the model may be presented simultaneously with an interface, such as overlaid in front of a preceding interface. In such a case, portions of the preceding interface may be visible and accessible behind the model, such as by providing input to a region of the interface outside of the edges of the model. In some implementations, when user input to increase a level of magnification associated with the model is received, presentation of text or other non-image data may be ceased. For example, user input to increase a level of magnification may indicate an intent to enlarge the displayed model to view portions of the item more closely. In such a case, the presentation of other information may hinder the view of the model, and the presentation may be ceased until the level of magnification is reduced to a selected value.

In some implementations, one or more regions of the model may be configured to receive user input. For example, user input may be provided to indicate a sole of a shoe, a button on a dress, and so forth. In response to the user input, one or more additional images or non-image data associated with the portion of the item that corresponds to the region of the model may be determined. For example, in response to user input indicating a sole of a shoe, user reviews that reference the sole of the shoe may be presented, detailed or enlarged images of the sole may be presented, and so forth.

As one skilled in the art will appreciate in light of this disclosure, certain embodiments may be capable of achieving certain advantages, including some or all of the following: Presentation of a user interface that includes images but excludes non-image data may enable a user to view a larger amount of information at one time, especially when using a mobile device or another type of device having a limited display area. Enabling a user to access additional information when an image is selected without navigating away from the underlying interface may allow more efficient acquisition of information regarding multiple presented images without losing the context associated with the information that is presented. Retaining headings or other indications of a category for each image in a stationary orientation while the images are scrolled may further assist a user in retaining the category or other context associated with each image. Use of a model that represents a three-dimensional view of an item may enable a user to visualize multiple parts of an item using a single interface. Additionally, in some cases, the user may access additional information regarding different parts of an item through interaction with the model, allowing for efficient and intuitive navigation to different information without requiring separate queries or navigations to separate interfaces to obtain this information. Interfaces that enable more efficient navigation to different information for users may also result in fewer search queries, page requests, and other user interactions, which may result in consumption of fewer computational resources and an improved user experience.

Figure 1B:
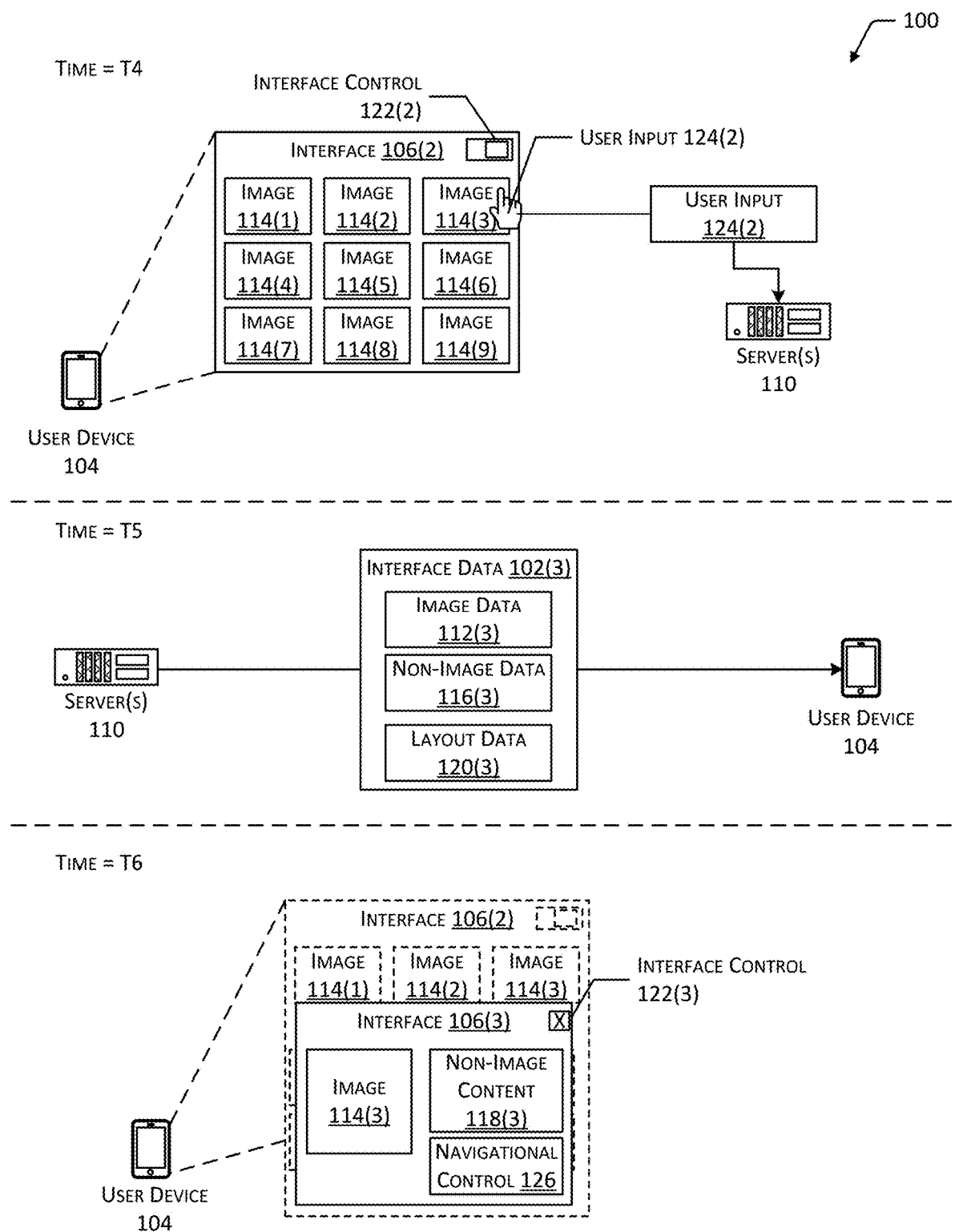

FIGS. 1A and 1B depict an implementation of a system 100 for providing interface data 102 to a user device 104 to cause presentation of interfaces 106 that prioritize image data 112 and other information of interest. At a first time T1, one or more servers 110 may provide first interface data 102(1) to a user device 104. For example, the user device 104 may provide a request to the server(s) 110 to access a webpage or to view particular content. Continuing the example, the user device 104 may provide data indicative of a search query or other type of request, and the first interface data 102(1) may include content indicative of one or more search results that are responsive to the search query. While FIG. 1A depicts a server 110 providing the first interface data 102(1) to the user device 104, any number and any type of computing devices may be used to access and send interface data 102 including, without limitation, portable computing devices, personal computing devices, wearable computing devices, servers, and so forth. Additionally, while FIG. 1A depicts the user device 104 as a smartphone, the user device 104 may include any number and any type of computing devices including, without limitation, the types of computing devices described with regard to the server(s) 110.

The first interface data 102(1) may include one or more types of data to cause the user device 104 to present a first interface 106(1). For example, the user device 104 may execute a browser application or another type of application that may generate the first interface 106(1) based on the first interface data 102(1). In other implementations, the server(s) 110 may generate one or more portions of the first interface 106(1) and provide the portion(s) of the first interface 106(1) to the user device 104 for presentation. The first interface data 102(1) may include image data 112, which may be used to cause presentation of an image 114 in the corresponding first interface 106(1). The first interface data 102(1) may also include non-image data 116, such as text or one or more other types of data, associated with each image data 112. For example, the non-image data 116 may cause presentation of text adjacent to a corresponding image 114. The first interface data 102(1) may include any number of image data 112 and any number of non-image data 116. For example, FIG. 1A depicts the first interface data 102(1) including first image data 112(1) associated with first non-image data 116(1), second image data 112(2) associated with second non-image data 116(2), and any number of additional image data 112(N) associated with corresponding non-image data 116(N). For example, each set of image data 112 and corresponding non-image data 116 may correspond to a single search result for which the first interface 106(1) may present an image 114 in association with text or other non-image content 118. While FIG. 1A depicts each image data 112 associated with non-image data 116, in other implementations, the first interface data 102(1) may include one or more of image data 112 that is not associated with non-image data 116 or non-image data 116 that is not associated with image data 112. For example, the first interface data 102(1) may cause output of a first interface 106(1) in which an image 114 is presented without corresponding text or other non-image content 118, or presentation of non-image content 118 without a corresponding image 114.

The first interface data 102(1) may also include layout data 120(1) which may be used to determine the arrangement of images 114, non-image content 118, and other elements within the first interface 106, such as headings, titles, indications of categories, and so forth. In some implementations, other elements included in the first interface 106(1) may include an interface control 122(1) that may be used to cause presentation of a second interface 106(2) that prioritizes presentation of images 114.

At a second time T2, the user device 104 may present the first interface 106(1) based on the first interface data 102(1). The first interface 106(1) may include a first image 114(1) based on the first image data 112(1), a second image 114(2) based on the second image data 112(2), a third image 114(3) based on third image data 112(3), and a fourth image 114(4) based on fourth image data 112(4) (not shown). The first interface 106(1) may also include first non-image content 118(1), such as text, presented in association with the first image 114(1), based on the first non-image data 116(1). FIG. 1A also depicts the first interface 106(1) including second non-image content 118(2) based on the second non-image data 116(2), third non-image content 118(3) based on third non-image data 116(3), and fourth non-image content 118(4) based on fourth non-image data 116(4) (not shown). For example, each image 114 may depict an item that is responsive to a search query, and each image 114 may be presented adjacent to or otherwise associated with non-image content 118, such as text indicating an item name, price, description, user rating or review score, or other information. The arrangement of images 114 and non-image content 118 may be determined based in part on the layout data 120(1) of the first interface data 102(1). For example, based on the layout data 120(1), the first image 114(1) may be shown above and adjacent to the first non-image content 118(1), the second image 114(2) may be shown to the right of the first image 114(1) and above the second non-image content 118(2), the third image 114(3) may be shown below the first image 114(1) and above the third non-image content 118(3), and the fourth image 114(4) may be shown to the right of the third image 114(3) and above the fourth non-image content 118(4). Additional images 114 and non-image content 118 may be viewed by scrolling the first interface 106(1) or providing input to one or more controls to access other screens or pages of the first interface 106(1). Due to the inclusion of both images 114 and non-image content 118 within the first interface 106(1), the user device 104 may only present a limited number of images 114 based on the size of the display area of the user device 104.

The first interface 106(1) may include an interface control 122(1) that may be used to cause presentation of a second interface 106(2) that prioritizes presentation of images 114. For example, the interface control 122(1) may include a button, switch, toggle, or other type of control that may be configured to receive user input 124(1), such as a touch input to a touch sensor, or input provided to the interface control 122(1) using a mouse device, keyboard, or other input device.

At a third time T3, in response to user input 124(1) indicating the interface control 122(1), the server(s) may provide second interface data 102(2) to the user device 104 to cause presentation of a second interface 106(2). The second interface data 102(2) may be determined based on the first interface data 102(1). In some implementations, the second interface data 102(2) may be determined in response to the user input 124(1) indicating the interface control 122(1). In other implementations, the second interface data 102(2) may be determined when the first interface data 102(1) is provided to the user device 104, or at another time prior to receiving the user input 124(1) indicating the interface control 122(1). For example, interface data 102 for presenting one or more alternate interfaces 106 that present information included in the first interface 106(1) may be determined at or proximate to the time that the first interface data 102(1) is used to cause presentation of the first interface 106(1).

The second interface data 102(2) may include a subset of the data included in the first interface data 102(1). In some implementations, the second interface data 102(2) may include additional data not included in the first interface data 102(1). For example, FIG. 1A depicts the second interface data 102(2) including the first image data 112(1), second image data 112(2), and any number of additional image data 112(N) included in the first interface data 102(1). However, the second interface data 102(2) excludes the non-image data 116 that was included in the first interface data 102(1). For example, the second interface data 102(2) may cause presentation of a second interface 106(2) that includes each of the images 114 of the first interface 106(1), but excludes the non-image content 118 of the first interface 106(1). In some implementations, the second interface data 102(2) may include all of the image data 112 included in the first interface data 102(1) while excluding other types of data. In other implementations, the second interface data 102(2) may include only a subset of the image data 112 included in the first interface data 102(1). For example, the second interface data 102(2) may include image data 112 that corresponds to images 114 associated with search results, such as images that depict items available for purchase, while excluding images 114 that correspond to advertisements, user reviews, or other images that may be of less interest or relevance to a user of the user device 104.

The second interface data 102(2) may also include layout data 120(2), which may be used to determine the arrangement of images 114 and other elements in the second interface 106(2). The arrangement of elements, the dimensions of the elements, and so forth that are included in the second interface 106(2) may differ from the arrangement and dimensions of elements in the first interface 106(1).

As shown in FIG. 1B, at a fourth time T4, the user device 104 may present the second interface 106(2) based on the second interface data 102(2). The second interface 106(2) may include the first image 114(1) based on the first image data 112(1), the second image 114(2) based on the second image data 112(2), the third image 114(3) based on third image data 112(3) (not shown), the fourth image 114(4) based on fourth image data 112(4) (not shown), a fifth image 114(5) based on fifth image data 112(5) not shown, a sixth image 114(6) based on sixth image data 112(6) (not shown), a seventh image 114(7) based on seventh image data 112(7) (not shown), an eighth image 114(8) based on eighth image data 112(8) (not shown), and a ninth image 114(9) based on ninth image data 112(9) (not shown). As shown in FIG. 1B, in some implementations, the second interface 106(2) may present the images 114 in a grid pattern, such as a grid having three rows that each include three images 114. In other implementations, the second interface 106(2) may include other arrangements of images 114 which may be determined based in part on the layout data 120(2). In some cases, arrangements or other characteristics of images 114 may be determined based on characteristics of the items presented in the images 114. For example, images 114 of items associated with greater counts of purchases, greater counts of user reviews, greater user ratings, and so forth may be presented prior to images 114 of other items, or may be provided with larger dimensions than images 114 of other items. Other images 114 may be viewed by scrolling the second interface 106(2) or by providing input to controls to access other screens or pages of the second interface 106(2). Due to the inclusion of images 114 in the second interface 106(2) and the exclusion of non-image content 118, information relating to a larger quantity of search results or items available for purchase may be presented within a display area of the user device 104. In cases where the second interface 106(2) presents information relating to visual purposes, such as images 114 of items for which the appearance of the items is highly relevant, a user may more readily access a larger quantity of relevant information with a smaller amount of scrolling or navigation when compared to the first interface 106(1).

The second interface 106(2) may include an interface control 122(2) which may be used to navigate to the first interface 106(1). For example, the interface control 122(2) may include a button, switch, toggle, or other type of element that may be of a similar type as the interface control 122(1) presented in the first interface 106(1). In other cases, the interface control 122(2) presented in the second interface 106(2) may be of a different type than the interface control 122(1) presented in the first interface 106(1). The second interface 106(2) may also be configured to receive user input 124(2) indicating one of the images 114. For example, a touch or near-touch input provided to a region of a touch sensor corresponding to an image 114, a mouse or keyboard input selecting an image 114, positioning a mouse cursor over or proximate to an image 114, and so forth, may be used to indicate a particular image 114. Continuing the example, FIG. 1B depicts user input 124(2) indicating the third image 114(3).

At a fifth time T5, in response to the user input 124(2) indicating a particular image 114(3), the server(s) 110 may determine third interface data 102(3). In some implementations, the third interface data 102(3) may be based in part on the first interface data 106(1). For example, the third interface data 102(3) may include portions of the first interface data 102(1) that are associated with the particular image 114(3) indicated by user input 124(2) to the second interface 106(2). In some implementations, the third interface data 102(3) may be determined in response to the user input 124(2) indicating the particular image 114(3). In other implementations, the third interface data 102(3) may be determined before the user input 124(2) is received. For example, interface data 102 for presenting one or more alternate interfaces 106 that present particular subsets of the information included in the first interface 106(1) may be determined at or proximate to the time that the first interface data 102(1) is used to cause presentation of the first interface 106(1).

The third interface data 102(3) may include the third image data 112(3). For example, a third interface 106(3) based on the third interface data 102(3) may include the third image 114(3). In some implementations, the third interface data 102(3) may include image data 112 associated with one or more other images 114 other that the third image 114(3). For example, the third interface 106(3) may include one or more additional images 114 associated with an item, in addition to or in place of the third image 114(3) shown in the first interface 106(1) and second interface 106(2). The third interface data 102(3) may also include the third non-image data 116(3). For example, the third interface 106(3) may present at least a portion of the non-image content 118(3) associated with the third image 114(3). In some implementations, the third interface data 102(3) may include all of the third non-image data 116(3). In other implementations, the third interface data 102(3) may include only a subset of the third non-image data 116(3). In still other implementations, the third interface data 102(3) may include additional non-image data 116 that is not included in the first interface data 102(1). For example, the third interface 106(3) may present additional information regarding an item that is not presented in the first interface 106(1). The third interface data 103(3) may also include layout data 120(3), which may be used to determine the arrangement of elements in the third interface 106(3). While FIG. 1B depicts the third interface 106(3) presented in response to user input 124(2) to a particular image 114(3) of the second interface 106(2), in other implementations, the third interface 106(3) may be presented in response to user input 124 indicating an image 114 of the first interface 106(1). For example, independent of whether user input 124(1) is provided to the interface control 122(1) to cause presentation of a second interface 106(2) that prioritizes presentation of images 114, selection of a particular image 114 from either the first interface 106(1) or the second interface 106(2) may cause the third interface 106(3) to be presented.

At a sixth time T6, the user device 104 may present the third interface 106(3) based on the third interface data 102(3). FIG. 1B depicts the third interface 106(3) including the third image 114(3) positioned adjacent to the third non-image content 118(3). In other implementations, the third interface 106(3) may include one or more additional images 114 in addition to or in place of the third image 114(3). In some cases, additional images 114 may be viewed by scrolling the third interface 106(3) or providing input to one or more controls associated with the third image 114(3), such as a selector or a navigational button. In still other implementations, the third image 114(3) may be omitted. For example, the third interface 106(3) may present non-image content 118 without presenting images 114. Additionally, in some implementations, the third interface 106(3) may include other non-image content 118 in addition to or in place of the third non-image content 118(3). In other implementations, the third interface 106(3) may omit the third non-image content 118(3) and may instead present the third image 114(3) and in some cases, one or more other images 114.

In some implementations, the third interface 106(3) may be presented within a frame presented with the second interface 106(2). For example, FIG. 1B depicts the third interface 106(3) presented in front of the second interface 106(2) (e.g., in a foreground while the second interface 106(2) is in a background). Presentation of the third interface 106(3) in a frame within the second interface 106(2) may enable at least a portion of the second interface 106(2) to be visible and accessible while the third interface 106(3) is presented. Presentation of the third interface 106(3) simultaneously with at least a portion of the second interface 106(2) may enable a user to continue to view images 114 within the second interface 106(2) and retain awareness of the context of the information presented in the third interface 106(3). In some cases, at least a portion of the third interface 106(3) may be at least partially transparent to enable a view of an underlying portion of the second interface 106(2). Presentation of the third interface 106(3) simultaneously with at least a portion of the second interface 106(2) may also facilitate navigation to the second interface 106(2). For example, user input 124 provided to a portion of the second interface 106(2) that is visible while the third interface 106(3) is presented may be used to navigate to the second interface 106(2). In such a case, presentation of the third interface 106(3) may be ceased, or the second interface 106(2) may be moved to a foreground while the third interface 106(3) is moved to a background. In some implementations, at least a portion of the second interface 106(2) may be presented as a frame within the third interface 106(3), or may be at least partially transparent to enable the third interface 106(3) to be visible and accessible while the second interface 106(2) is presented.

In some implementations, the third interface 106(3) may include an interface control 122(3), such as a button or other element, that may be used to cease presentation of the third interface 106(3) and resume access to the second interface 106(2). Additionally, in some implementations, the third interface 106(3) may include one or more navigational controls 126 that may be used to navigate to additional interfaces 106 that present information regarding items associated with the image 114(3) or the non-image content 118(3), such as an interface 106 where reviews associated with an item may be viewed or a purchase transaction for an item may be initiated. In other implementations, the navigational control(s) 126 may be usable to view one or more reviews associated with an item, initiate a purchase transaction for the item, add the item to an electronic shopping cart or an electronic list of items, and so forth, without navigating to an additional interface 106.

Figure 2A:
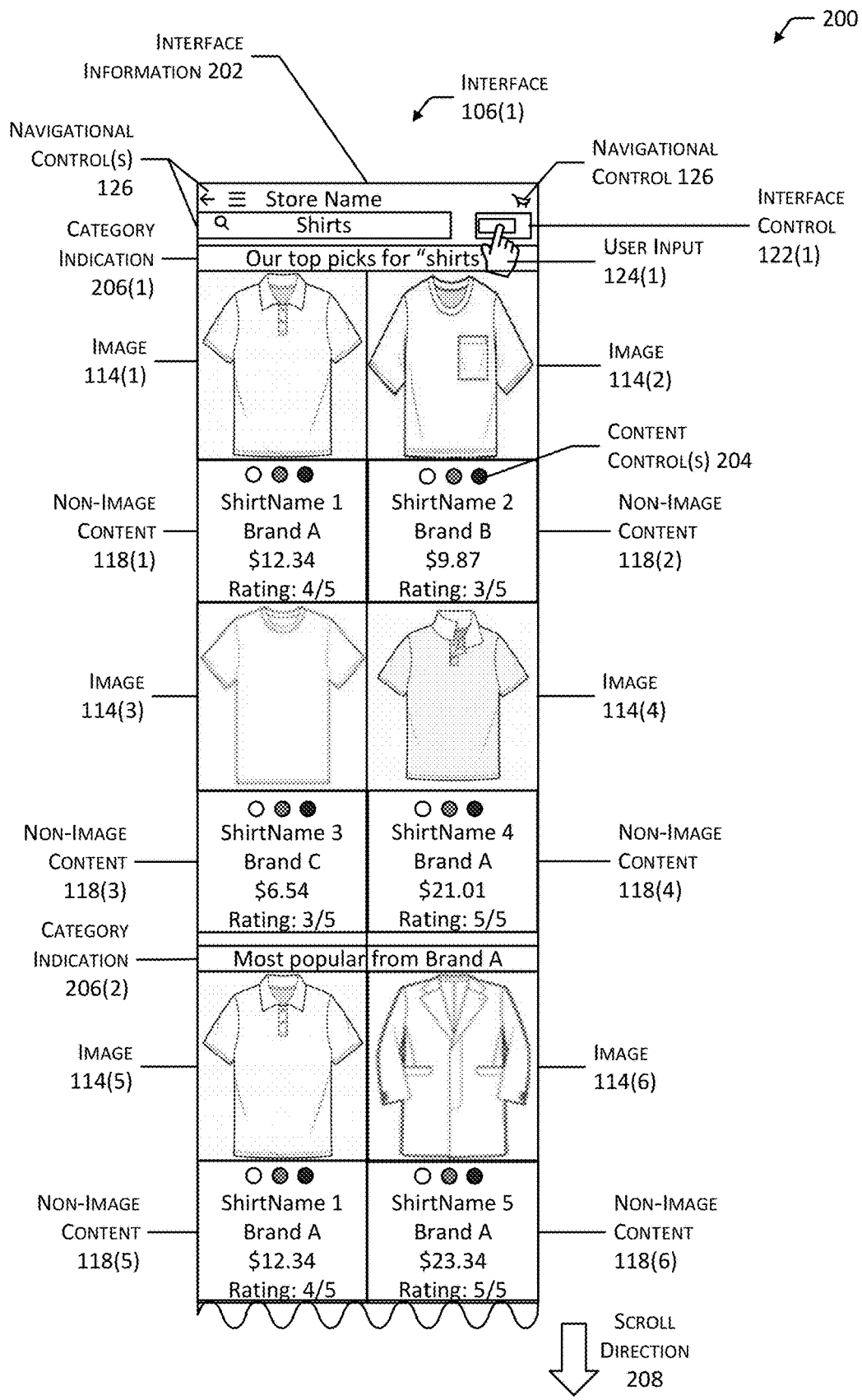
FIG. 2A is a diagram depicting an example of a first interface that may be used to determine a second interface in response to user input to an interface control.

FIG. 2A is a diagram 200 depicting an example of a first interface 106(1) that may be used to determine a second interface 106(2) in response to user input 124 to an interface control 122(1). As described with regard to FIGS. 1A and 1B, a first interface 106(1) may be generated based on first interface data 102(1), and may present images 114 based on image data 112, and non-image content 118 based on non-image data 116. The first interface 106(1) may include interface information 202, such as a title or heading that identifies the first interface 106(1), an online store or other entity associated with the first interface 106(1), information indicative of the server(s) 110 or other computing devices associated with the first interface 106(1), information indicative of the user device 104 or user accessing the first interface 106(1), and so forth. The first interface 106(1) may also include one or more navigational controls 126 that may be used to navigate to other interfaces 106. For example, a navigational control 126 may include buttons or other controls associated with a browser application, such as a "back" button to access a previously-viewed interface 106. As another example, a navigational control 126 may include a button or control to access a menu or other type of selector for indicating a subsequent interface 106 for access. As yet another example, a navigational control 126 may include a textual or pictorial link for accessing other interfaces 106. Continuing the example, a navigational control 126 may include a graphic representing a shopping cart that may function as a link to an electronic shopping cart associated with a user account. One or more presented images 114 or non-image content 118 may also function as navigational controls 126. For example, user input 124 provided to an image 114 or non-image content 118 may cause navigation to a subsequent interface 106 that presents additional information regarding the selected image 114 or non-image content 118. The first interface 106(1) may also include an interface control 122(1), such as a switch, button, selector, or other type of control, that may be used to cause presentation of a second interface 106(2) that prioritizes presentation of images 114.

FIG. 2A depicts each image 114 in association with non-image content 118. For example, the first interface 106(1) may include a series of search results that are presented in response to input of a search query, such as a query including the keyword "shirts". Each image 114 may depict an item that is responsive to the search query, and each non-image content 118 may include text or other information that describes the depicted item. For example, FIG. 2A depicts the first image 114(1) as a shirt, which is shown above and adjacent to first non-image content 118(1), which includes text indicating a name of the item, a brand of the item, a price of the item, and a rating of the item. In some implementations, an image 114 may also be shown in association with a content control 204. For example, each image 114 in the first interface 106(1) is shown adjacent to a selector that presents multiple colors in which an item is available. Input provided to a content control 204 may be used to select a particular variation associated with an item. In response to the input provided to the content control 204, the corresponding image 114 may be modified or replaced with an alternate image 114 that depicts the selected variation or characteristic of the item.

Each image 114 is also shown in association with an indication of a category. For example, FIG. 2A depicts a first category indication 206(1) as a heading. The first image 114(1), first non-image content 118(1), second image 114(2), second non-image content 118(2), third image 114(3), third non-image content 118(3), fourth image 114(4), and fourth non-image content 118(4) are shown beneath and associated with the first category indication 206(1). Similarly, FIG. 2A depicts a fifth image 114(5), fifth non-image content 118(5), a sixth image 114(6), and sixth non-image content 118(6) in association with a second category indication 206(2).

The first user interface 106(1) may be scrolled, as indicated by the scroll direction 208 arrow, to present additional content. For example, a display area of a user device 104 may display the six images 114 and non-image content 118 shown in FIG. 2A, or only a portion of this content, depending on the size of the display area. Additional images 114 and non-image content 118 may be accessed by scrolling the first user interface 106(1), however, scrolling the user interface 106(1) may cause the category indications 206 and one or more of the images 114 or non-image content 118 to scroll out of view. In such a case, a user device 104 having a limited display area may only present information relating to a small number of items at a single time, and if a category indication 206 is not also included in the display area, a user may be unaware of the category or other context associated with the displayed images 114 and non-image content 118. As described previously, in response to user input 124(1) to the interface control 122(1), a second interface 106(2) may be presented that prioritizes presentation of images 114 to enable information regarding a large number of items to be presented at a single time.

Figure 2B:
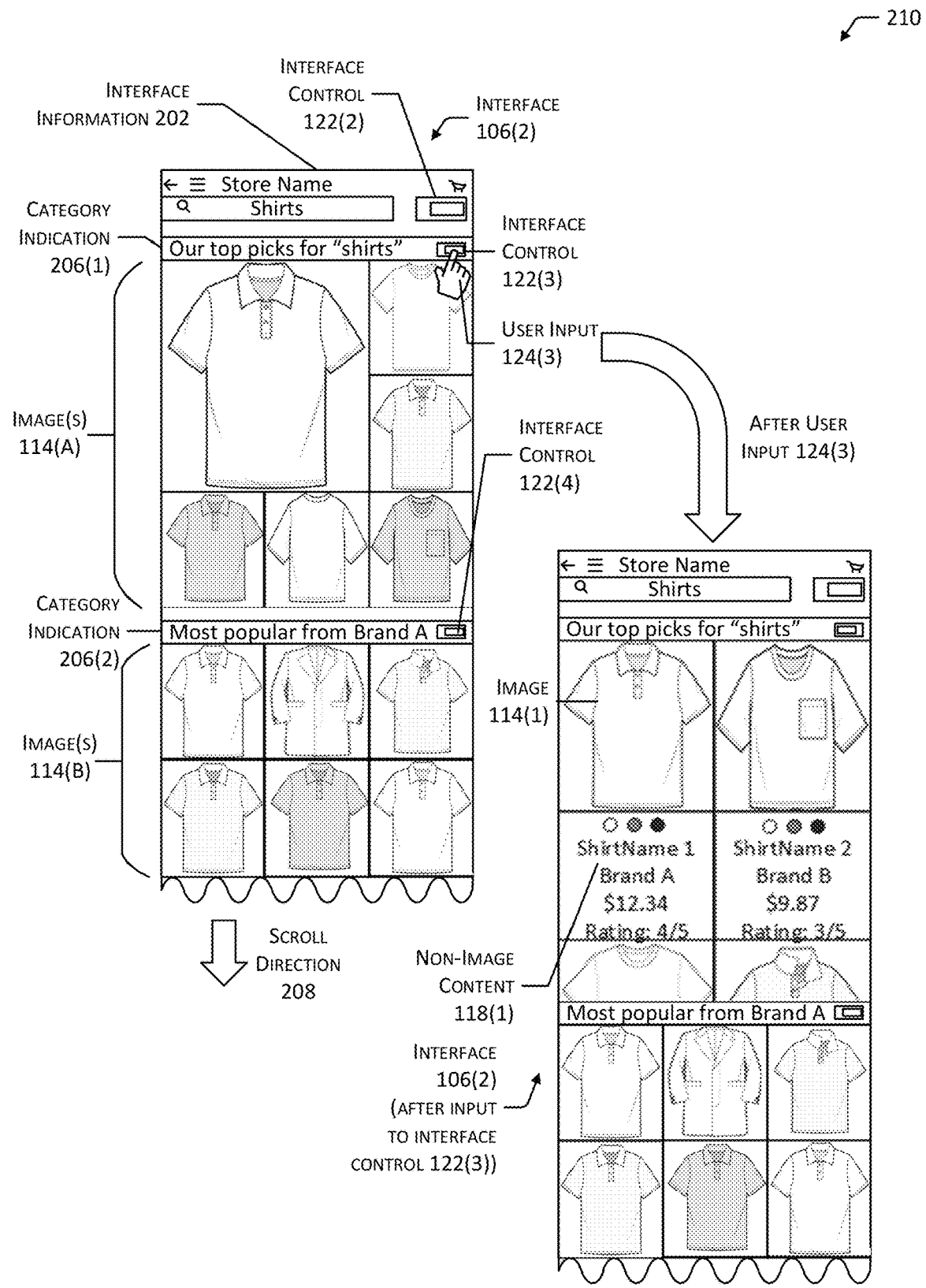
FIG. 2B is a diagram depicting an example of a second interface that prioritizes presentation of images and may cause presentation of non-image content in selected sections in response to user input to an interface control.

FIG. 2B is a diagram 210 depicting an example of a second interface 106(2) that prioritizes presentation of images 114 and may cause presentation of non-image content 118 in selected sections in response to user input 124(3) to an interface control 122(3). In response to user input 124(1) indicating the interface control 122(1) of the first interface 106(1), second interface data 102(2) may be provided to a user device 104 to cause presentation of the second interface 106(2). The second interface 106(2) may present at least a portion of the images 114 of the first interface 106(1) in association with category indications 206, while excluding presentation of at least a portion of the non-image content 118 of the first interface 106(1). For example, FIG. 2B depicts the second interface 106(2) presenting a first set of images 114(A) in association with the first category indication 206(1) of the first interface 106(1). The first set of images 114(A) may include the first image 114(1), second image 114(2), third image 114(3), and fourth image 114(4) shown in FIG. 2A in association with the first interface 106(1). The first set of images 114(A) may also include one or more additional images 114 that may be associated with the first category indication 206(1) but that were not visible in the first interface 106(1) without scrolling the first interface 106(1). For example, the second interface 106(2) may exclude presentation of non-image content 118 associated with the first set of images 114(A). Additionally, in some implementations, the first set of images 114(A) may have one or more dimensions that are smaller than the images 114 shown in the first interface 106(1). For example, FIG. 2B depicts the first set of images 114(A) including six images 114 that are visible without scrolling the second interface 106(2). A first image 114 is shown having larger dimensions than the other images 114 within the first set of images 114(A). For example, images 114 of items associated with a greater count of purchases, a larger price, a greater count of positive user reviews, and so forth, may be presented prior to images 114 of other items or may be provided with larger dimensions than images 114 of other items. In other implementations, the images 114 of the first set of images 114(A) may have the same dimensions. For example, the first set of images 114(A) visible in the second interface 106(2) may be sized for display in a grid arrangement having three rows of three images 114. In a similar manner, FIG. 2B shows the second interface 106(2) presenting a second set of images 114(B) in association with the second category indication 206(2). The second set of images 114(B) may include the fifth image 114(5) and sixth image 114(6) shown in the first interface 106(1) of FIG. 2A, as well as one or more additional images 114 that may be associated with the second category indication 206(2) but that were not visible in the first interface 106(1) without scrolling the first interface 106(1). The second interface 106(2) may be scrolled, as indicated by the scroll direction 208 arrow, to enable additional images 114, category indications 206, and other content to be visible within a display area of a user device 104.

Additionally, in some implementations, the second interface 106(2) may include the same or similar interface information 202 and navigational controls 126 as those presented in the first interface 106(1). The second interface 106(2) may also include an interface control 122(2) that may be used to cause presentation of the first interface 106(1), such as a switch, button selector, or other type of control in a position that corresponds to the position of the interface control 122(1) in the first interface 106(1).

In some implementations, one or more sections of the second interface 106(2) may include interface controls 122 for controlling the arrangement of content within that section of the second interface 106(2). For example, FIG. 2B depicts an interface control 122(3) associated with the section of the second interface 106(2) presenting the first category indication 206(1) and first set of images 114(A). FIG. 2B depicts another interface control 122(4) associated with the section of the second interface 106(2) presenting the second category indication 206(2) and the second set of images 114(B). User input 124(3) provided to the third interface control 122(3) or fourth interface control 122(4) may be used to request inclusion of content based on the first interface data 102(1) for that section of the second user interface 106(2). For example, FIG. 2B depicts user input 124(3) indicating the interface control 122(3) associated with the first category indication 206(1) and the first set of images 114(A). In response to the user input 124(3), the second user interface 106(2) may modify the content presented in the section associated with the first category indication 206(1) and the first set of images 114(A) while retaining the content presented in the section associated with the second category indication 206(2) and the second set of images 114(B).

Specifically, FIG. 2B depicts the second interface 106(2) after input to the interface control 122(3). After input to the interface control 122(3), the second interface 106(2) is shown presenting the first image 114(1), second image 114(2), first non-image content 118(1), and second non-image content 118(2) from the first interface 106(1), shown in association with the first category indication 206(1). The second interface 106(2) is shown presenting the second set of images 114(B) in association with the second category indication 206(2). Use of the interface controls 122(3) and 122(4) associated with individual sections of the second interface 106(2) may enable a user to select an arrangement of content that prioritizes images 114 for selected sections of the second interface 106(2), while selecting an arrangement of content that includes non-image content 118 for other sections of the second interface 106(2).

Figure 2C:
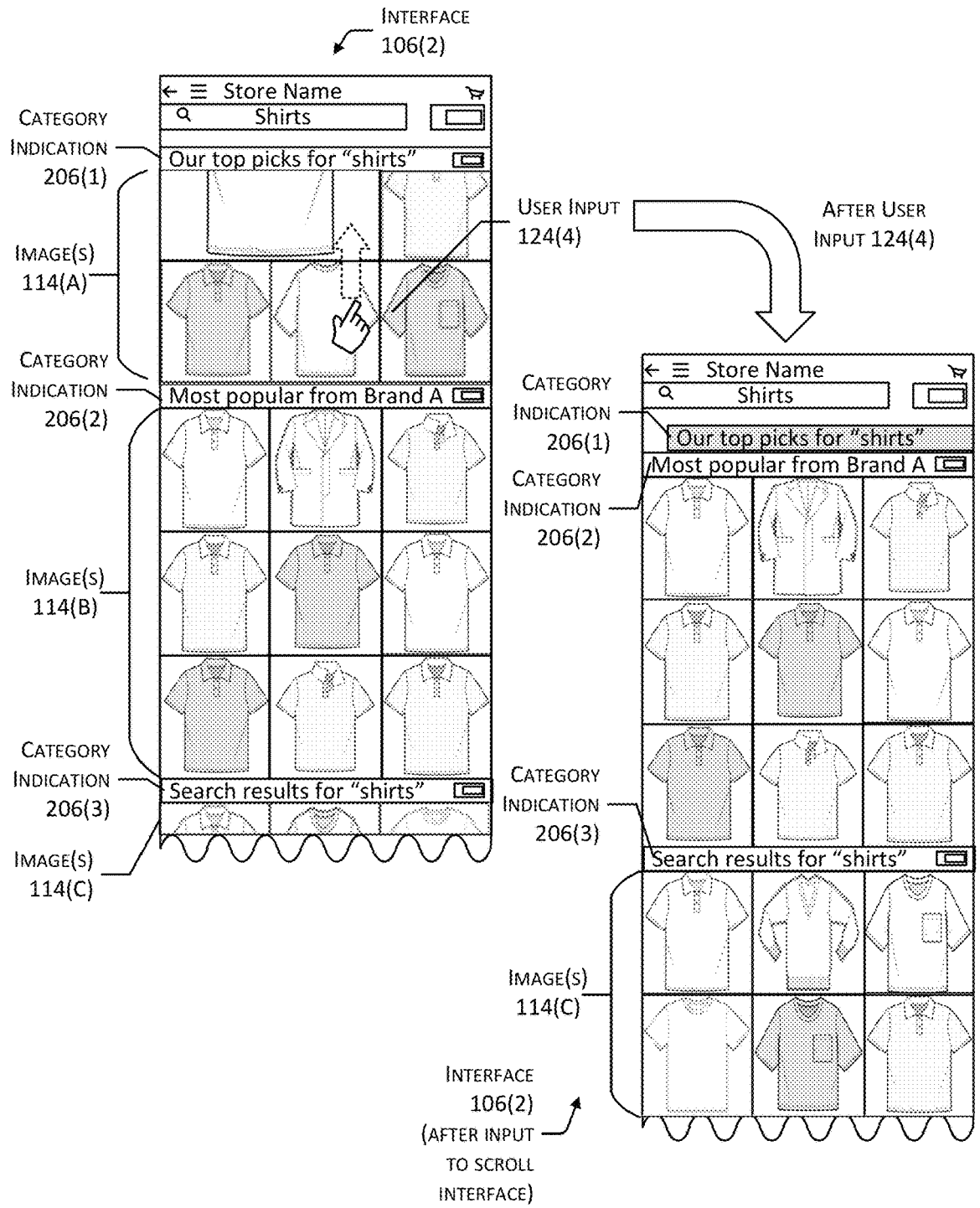
FIG. 2C is a diagram depicting an example of the second interface before and after receiving user input to scroll the second interface.

FIG. 2C is a diagram 212 depicting an example of the second interface 106(2) before and after receiving user input 124(4) to scroll the second interface 106(2). As described previously with regard to FIGS. 1A-2B, in some cases, additional content may be viewed by providing a user input 124(4) to scroll the second interface 106(2). For example, the second interface 106(2) may include a large number of search results that are responsive to a search query, but only a limited number of the search results may be displayed on a display area of a user device 104 at a single time. In some cases, scrolling of an interface 106 may fail to retain the context or category associated with content. For example, if a category indication 206 were scrolled out of view while additional images 114 associated with the category indication were scrolled into view, the additional images 114 may lack context when viewed independently without the category indication 206 present.

To retain the context associated with the images 114, the second interface 106(2) may be configured to scroll one or more images 114 in response to user input 124(4) while retaining one or more category indications 206 in a stationary orientation within the second interface 106(2). For example, FIG. 2C depicts a user input 124(4) provided to a region of the second interface 106(2) to scroll the second interface 106(2) in an upward direction. Continuing the example, the user input 124(4) may include a swipe touch gesture or other type of touch input. In other implementations, the user input 124(4) may include input provided to a scroll bar, button, or other navigational feature. In response to the user input 124(4), the first set of images 114(A) may scroll in an upward direction while the first category indication 206(1) remains in a stationary orientation. As a result, additional images 114 may be displayed in association with the first category indication 206(1) while retaining the context provided by the first category indication 206(1). For example, FIG. 2C depicts a portion of the first set of images 114(A) scrolling out of view while the first category indication 206(1) remains visible above the remaining portion of the first set of images 114(A). Scrolling of the second interface 106(2) may cause additional images in other sections, such as images 114(B) associated with the second category indication 206(2) to scroll into view. Additionally, scrolling of the second interface 106(2) may cause images 114(C) associated with an additional category indication 206(3) to scroll into view. For example, any number of additional category indications 206 and additional sets of images 114 may be accessed by scrolling the second interface 106(2), while each category indication 206 remains in a generally stationary orientation within the second interface 106(2).

FIG. 2C also depicts the second interface 106(2) after providing additional user input 124(4) to scroll the second interface 106(2). After each image 114(A) associated with the first category indication 206(1) has scrolled out of view, the first category indication 206(1) may be moved toward a background of the second interface 106(2). The scrolling of the second interface 106(2) may also cause additional images 114(B) associated with the second category indication 206(2) and third category indication 206(3) to scroll into view, while the second category indication 206(2) and third category indication 206(3) remain visible within the second interface 106(2). Therefore, the category indications 206 of the second interface 106(2) may remain visible to retain the context associated with the visible images 114 until each image associated with a category indication 206 has scrolled out of view, at which point the category indication 206 may be moved to a background of the second interface 106(2). If a user input 124 is received to scroll the second interface 106(2) in the opposite direction, a category indication 206 may be removed from the background and moved to a foreground of the second interface 106(2), and images 114 associated with the category indication 206 may scroll into view from an upper portion of the second interface 106(2).

Figure 3A:
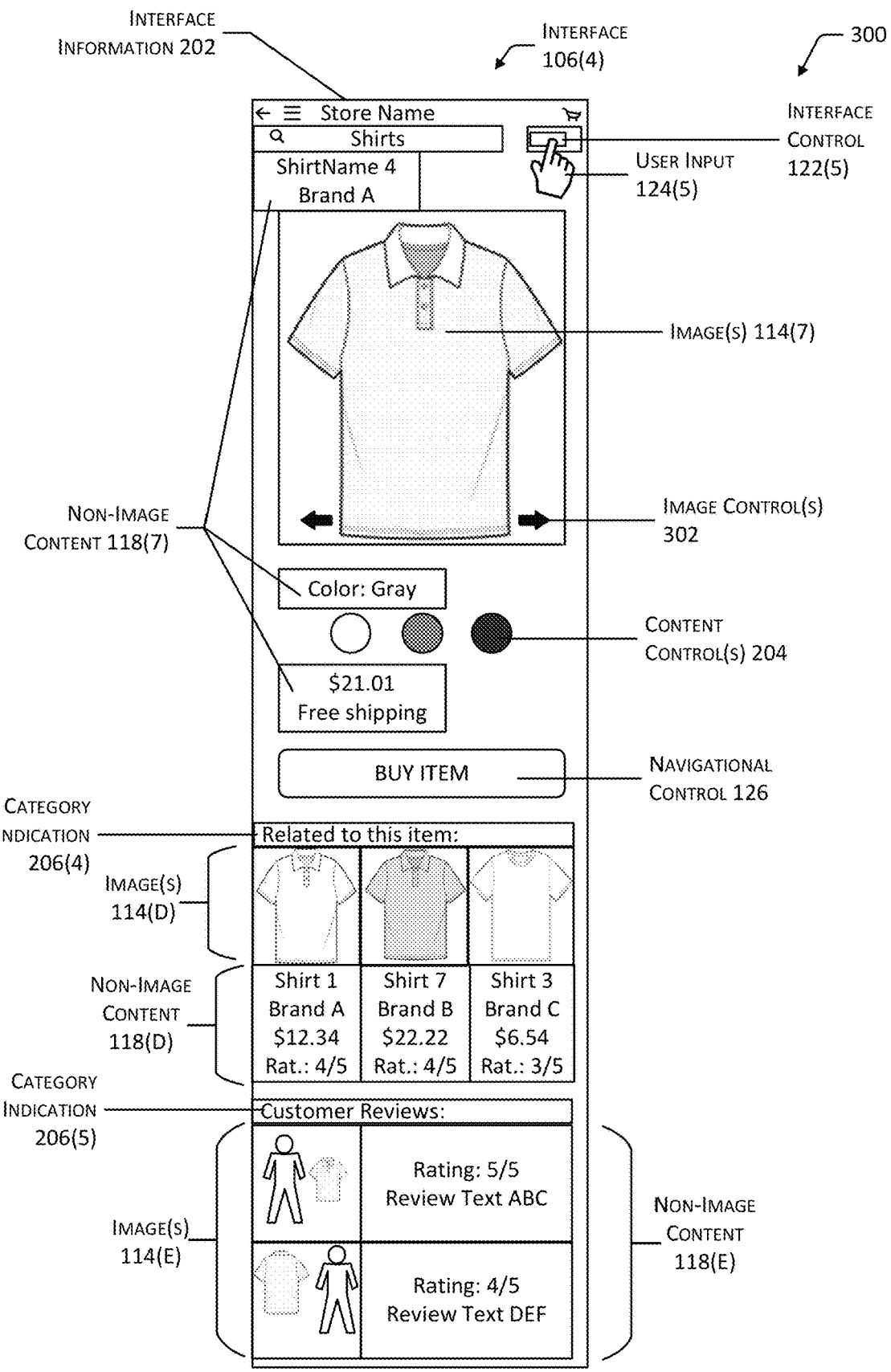
FIG. 3A is a diagram depicting an example of a fourth interface that provides information about an item and that may be used to determine a fifth interface in response to user input to an interface control.

FIG. 3A is a diagram 300 depicting an example of a fourth interface 106(4) that provides information about an item and that may be used to determine a fifth interface 106(5) in response to user input 124(5) to an interface control 122(5). As described with regard to FIG. 1B, when user input 124(2) indicating a particular image 114 is received via either the first interface 106(1) or the second interface 106(2), a third interface 106(3) may be presented that includes one or more images 114 or non-image content 118 associated with an item represented in the selected image 114. For example, the third interface 106(3) may be presented as a frame with the second interface 106(2) or the first interface 106(1), and a portion of the underlying second interface 106(2) or first interface 106(1) may be visible and accessible while the third interface 106(3) is presented. The third interface 106(3) may include a navigational control 126 or other feature that may navigate to the fourth interface 106(4), which may present additional information regarding an item. In other implementations, presentation of a third interface 106(3) may be omitted, and the fourth interface 106(4) may be presented in response to user input 124(2) indicating a particular image 114 within the first interface 106(1) or second interface 106(2).

The fourth interface 106(4) may present one or more images 114(7) of an item. In some implementations, one or more image controls 302 may be used to scroll or navigate between multiple images 114(7) of the item. For example, different images 114(7) that depict different variations or views of the item may be accessible using the image controls 302. Non-image content 118(7) may be presented in association with the image(s) 114(7), such as text indicating a name of the item, a brand of the item, a color or other characteristic of the item, a price of the item, shipping information, and so forth. In some implementations, the fourth interface 106(4) may include a content control 204. For example, FIG. 3A depicts the content control 204 as a selector that presents multiple colors in which an item is available. Input provided to the content control 204 may be used to select a particular variation associated with the item. In response to the input provided to the content control 204, the image 114(7) may be modified or replaced with an alternate image 114 that depicts the selected variation or characteristic of the item.

The fourth interface 106(4) may also include one or more additional images 114 and non-image content 118 that may be associated with one or more category indications 206. For example, the image(s) 114(7) shown in the fourth interface 106(4) may be associated with a first item. One or more second items that are related to the first item may be determined, and images 114(D) associated with the second item(s) may also be presented in the fourth interface 106(4). For example, the second item(s) may include items having the same or a similar type or category as the first item, items that share one or more characteristics with the first item, items that are frequently browsed or purchased by users that browse or purchase the first item, and so forth. Continuing the example, FIG. 3A depicts a category indication 206(4) indicative of items related to the item shown in the image(s) 114(7). A set of images 114(D) depicting items is shown in association with the category indication 206(4). Each image 114 of the set of images 114(D) is also shown associated with corresponding non-image content 118(D), such as text indicating an item name, brand, price, rating, and so forth.

FIG. 3A also depicts an example category indication 206(5) indicative of user reviews associated with the item shown in the image(s) 114(7). In some cases, reviews may include text or other non-image content 118. In other cases, reviews may include images 114. In still other cases, a review may include both images 114 and non-image content 118. For example, FIG. 3A depicts a set of images 114(E) associated with the category indication 206(5). Each image 114 of the set of images 114(E) is shown associated with corresponding non-image content 118(E), such as text associated with a rating or review of an item.

As described previously, user input 124(5) may be provide to the interface control 122(5) to request a fifth interface 106(5) that prioritizes presentation of at least a portion of the images 114 shown in the fourth interface 106(4) and includes at least a portion of the non-image content 118 of the fourth interface 106(4).

Figure 3B:
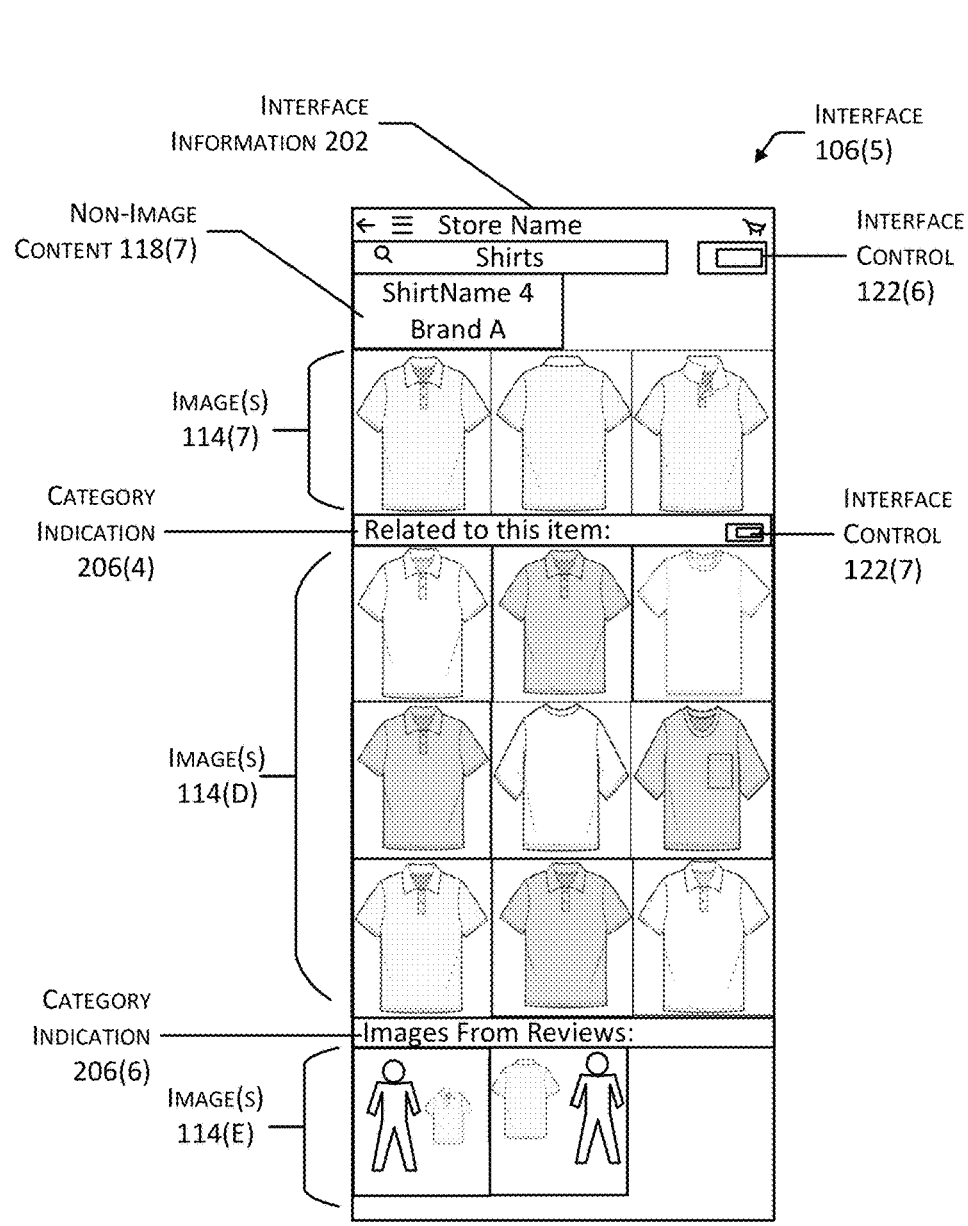
FIG. 3B is a diagram depicting an example of a fifth interface that prioritizes presentation of images and may be presented in response to user input to an interface control of the fourth interface of FIG. 3A.

FIG. 3B is a diagram 304 depicting an example of a fifth interface 106(5) that prioritizes presentation of images 114 and may be presented in response to user input 124(5) to an interface control 122(5) of the fourth interface 106(4) of FIG. 3A. The fifth interface 106(5) may include an interface control 122(6) that may receive input to cause presentation of the fourth interface 106(4). For example, the fifth interface 106(5) may include a switch, button, selector, or other type of control at a location corresponding to the location of the interface control 122(5) of the fourth interface 106(4).

The fifth interface 106(5) is shown presenting multiple images 114(7) representing an item. For example, the fourth interface 106(4) showed a single image 114(7) at one time, while other images 114(7) may be accessible by scrolling or using an image control 302. In some implementations, the fifth interface 106(5) may present more than one image 114(7) at a single time. In some cases, additional images 114(7) that are not visible in the fifth interface 106(5) may be viewed by scrolling or accessing image controls 302. In some implementations, the fifth interface 106(5) may retain a portion of the non-image content 118(7) associated with the images 114(7). For example, the fifth interface 106(5) is shown presenting text indicating an item name and brand associated with the images 114(7). Other non-image content 118(7) shown in the fourth interface 106(4) may be excluded from the fifth interface 106(5).

The fifth interface 106(5) may present at least a portion of the images 114 of the fourth interface 106(4) in association with corresponding category indications 206, while excluding at least a portion of the non-image content 118 associated with the images 114. For example, FIG. 3B depicts the fifth interface 106(5) presenting a set of images 114(D) associated with the category indication 206(4) of the fourth interface 106(4). The non-image content 118(D) of the fourth interface 106(4) is excluded from the fifth interface 106(5). As a result, a larger number of images 114(D) that may not have been visible in the fourth interface 106(4), or may have been accessed by scrolling or use of controls, may be presented in association with the category indication 206(4) in the fifth interface 106(5) in a manner that enables a larger number of images to be displayed at one time. In a similar manner, FIG. 3B shows the images 114(E) associated with the category indication 206(5), while excluding presentation of the non-image content 118(E) in the fifth interface 106(5).

In some implementations, the fifth interface 106(5) may include an interface control 122(7) associated with one or more sections of the fifth interface 106(5). As described with regard to FIG. 2B, user input 124(3) to the interface control 122(7) may selectively cause presentation of information from the fourth interface 106(4) to be shown in selected sections of the fifth interface 106(5). Additionally, as described with regard to FIG. 2C, in some implementations, additional images 114 or category indications 206 may be accessed by scrolling the fifth interface 106(5). In such a case, the category indications 206 may be retained within a display area of a user device 104 rather than scrolled out of view to retain the context and category associated with the images 114 that are visible in the display area.

Figure 4A:
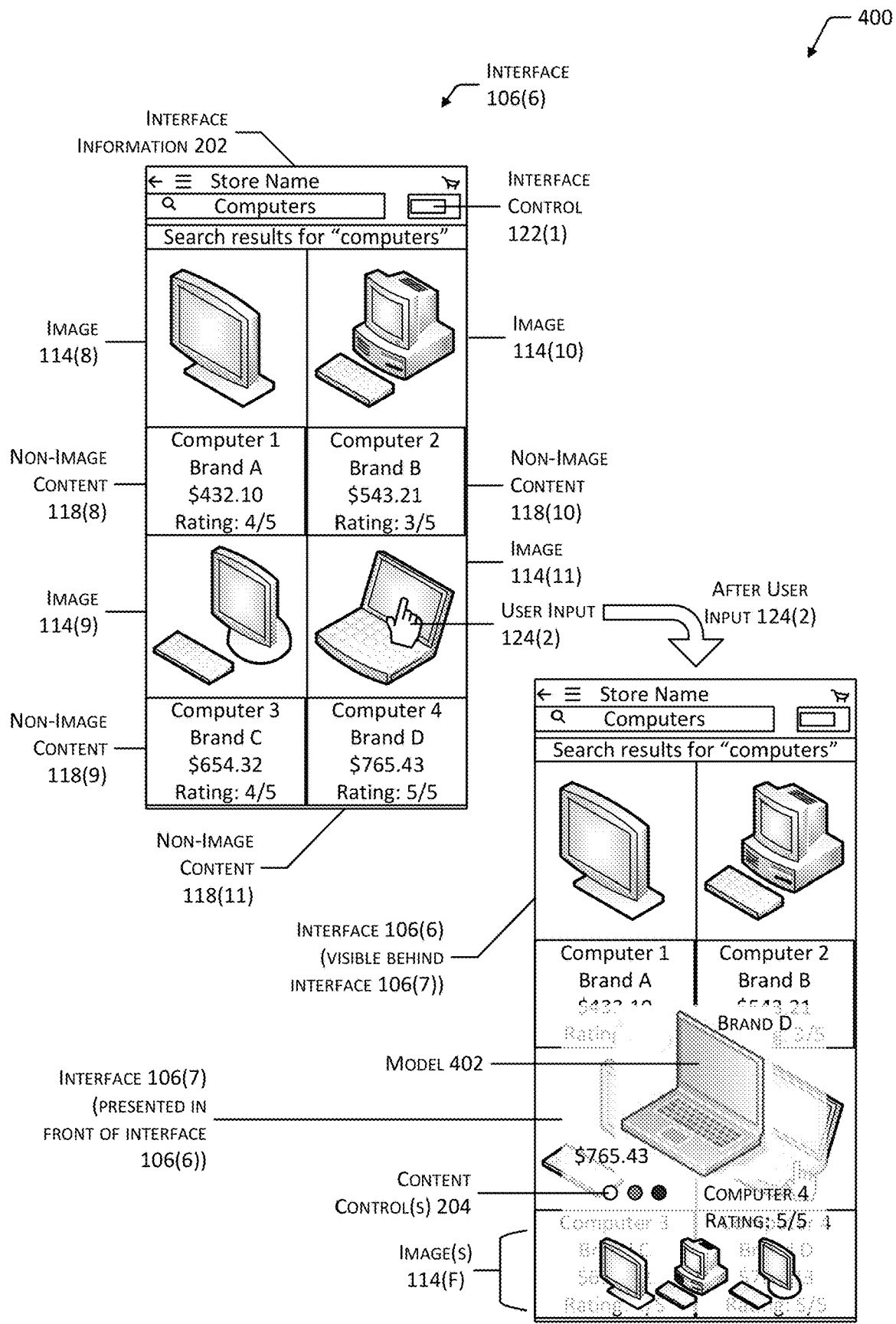
FIG. 4A is a diagram depicting an implementation of an interface that presents a model representing a three-dimensional view of an item.

FIG. 4A is a diagram 400 depicting an implementation of an interface 106(7) that presents a model 402 representing a three-dimensional view of an item. As described with regard to FIGS. 1B and 2C, in response to user input 124(2) indicating a particular image 114 within an interface 106(6), a subsequent interface 106(7) is presented with the previous interface 106(6), such as by presenting the subsequent interface 106(7) within a frame. For example, FIG. 4A depicts a sixth interface 106(6) in which four images 114 (8-11) are each shown in association with corresponding non-image content 118(8-11). Continuing the example, each image 114 may depict an item in response to a search query or other type of input, and each non-image content 118 may include text, such as a name or title of the item, a brand of the item, a price of the item, a rating or review score of the item, and so forth. As described with regard to FIGS. 1A-2B, the sixth interface 106(6) may include an interface control 122(1). In response to user input 124(1) to the interface control 122(1) a subsequent interface 106 that prioritizes the presentation of images 114 may be presented. Either the sixth interface 106(6) or the subsequent interface 106 may be configured to receive user input 124(2) indicative of a particular image 114. For example, FIG. 4A depicts user input 124(2), such as a touch gesture, tap gesture, mouse input, keyboard selection, and so forth, that indicates a particular image 114(11) within the sixth interface 106(6). As described with regard to FIG. 1B, in response to user input 124(2) indicating the particular image 114(11), a subsequent interface 106(7) that includes information regarding the selected image 114(11), or the item represented by the selected image 114(11), may be presented.

For example, FIG. 4A depicts a seventh interface 106(7) that includes a model 402 representing a three-dimensional view of the item represented in the selected image 114(11). In some implementations, the model 402 may be generated based on multiple images 114 of the depicted item. In other implementations, the model 402 may include an existing three-dimensional representation of the item. In some implementations, the model 402 may be configured to receive user input 124, such as a touch gesture or swipe gesture, to rotate the model 402 to a different orientation to enable a user to view different parts of an item. Additionally, in some implementations, user input 124 may be used to change a level of magnification associated with the model 402, which may enable a user to view different parts of an item more closely or from a more distant perspective. In some implementations, the model 402 may be presented simultaneously with the sixth interface 106(6). For example, portions of the sixth interface 106(6) may be visible behind the model 402.

The seventh interface 106(7) may also include at least a portion of the non-image content 118(11) associated with the selected image 114(11). For example, one or more regions of the seventh interface 106(7) that do not include the model 402 may be determined, and non-image content 118(11) may be positioned in at least a portion of those regions. For example, FIG. 4A depicts non-image content 118(11) indicative of an item name, price, brand, and rating positioned in regions of the seventh interface 106(7) that do not include the model 402. In some implementations, when user input 124 to increase a level of magnification associated with the model 402 is received, presentation of the non-image content 118(11) may be ceased. When the level of magnification associated with the model 402 is returned to a selected value, presentation of the non-image content 118(11) may be resumed. In some implementations, the seventh interface 106(7) may also include one or more content controls 204, such as buttons or other types of selectors for selecting a color or other characteristic or variation of the depicted item. In response to selection of a content control 204, the presented model 402 may be modified to have the appearance of the corresponding characteristic, or may be replaced with another model 402 having the characteristic.

In some implementations, the seventh interface 106(7) may include one or more additional images 114(F) that depict items related to the item represented by the model 402. User input 124 provided to one of the additional images 114(F) may cause navigation to a subsequent interface 106 that provides information regarding the item represented in the additional image 114(F). In some implementations, user input 124 provided to an additional image 114(F) may cause an interface 106 that is similar to the seventh interface 106(7) to be presented, and a model 402 associated with the item represented in the additional image 114(F) may be presented.

In some implementations, as described with regard to FIG. 1B, the seventh interface 106(7) may have a button or other type of interface control 122(3) that may cause presentation of the seventh interface 106(7) to cease in response to input to the interface control 122(3). For example, a touch input or mouse input indicating the interface control 122(3) may remove the seventh interface 106(7) from view and navigate to the sixth interface 106(6). In other implementations, user input 124 provided to a portion of the sixth interface 106(6) that is visible when the seventh interface 106(7) is presented may navigate to the sixth interface 106(6). Additionally, in some implementations, the seventh interface 106(7) may include a link or other type of navigational control 126 that may be used to navigate to a subsequent interface 106 that provides additional information regarding the depicted item, such as the interfaces 106 shown in FIGS. 3A and 3B. In some cases, the model 402 or one or more of the non-image content 118 that is presented may function as a navigational link to navigate to such an interface 106 when user input 124 indicating the model 402 or non-image content 118 is received. In other implementations, the seventh interface 106(7) may include a navigational control 126 to initiate a purchase transaction associated with the depicted item, add an indication of the depicted item to an electronic shopping cart, and so forth.

Figure 4B:
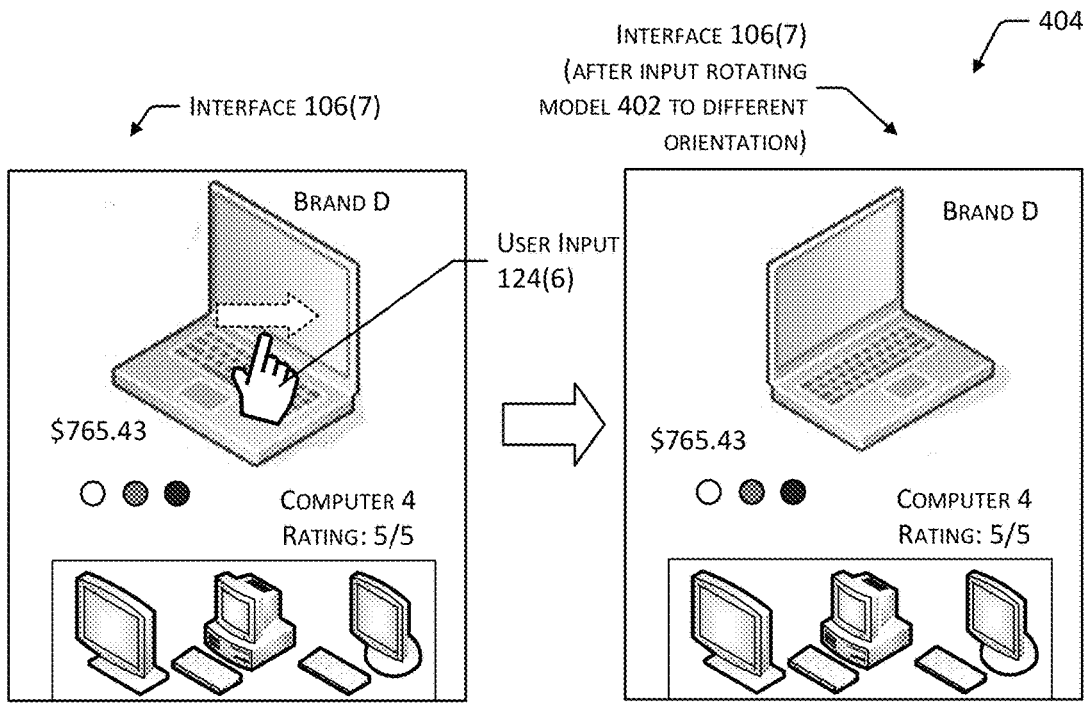
FIG. 4B is a series of diagrams depicting use of user input to change an orientation or level of magnification associated with a model presented in an interface.
Figure 4B:
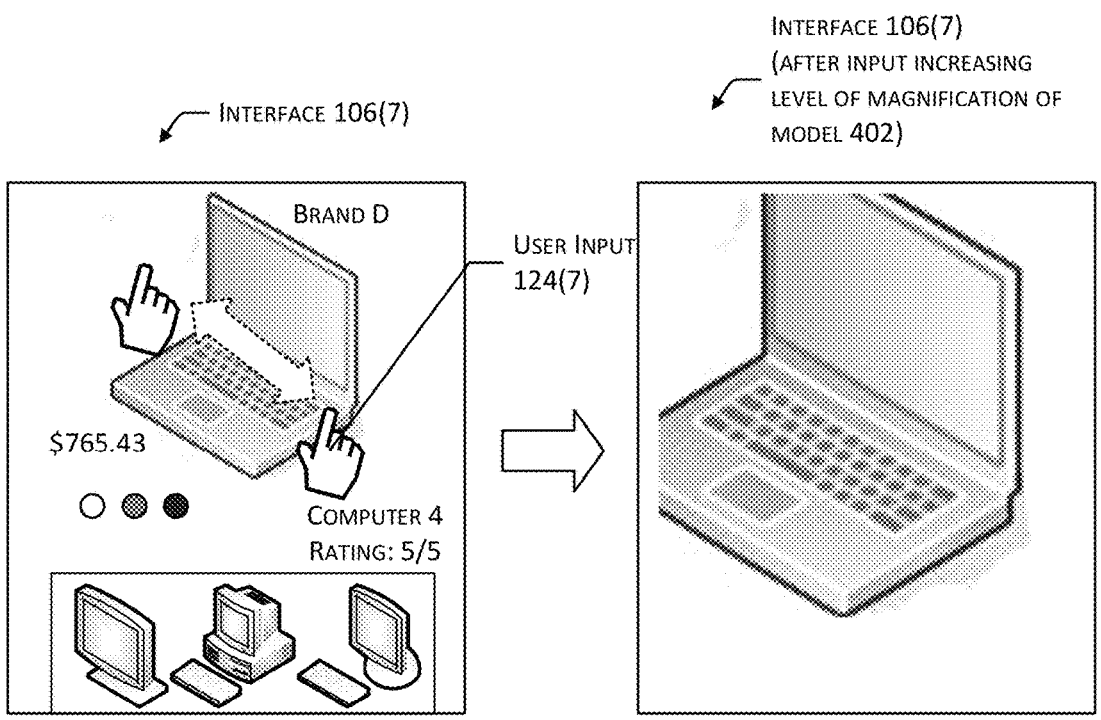

FIG. 4B is a series of diagrams 404 depicting use of user input 124 to change an orientation or level of magnification associated with a model 402 presented in an interface 106(7). As described previously, a model 402 may be generated that represents a three-dimensional view of an item. In response to user input 124(6), such as a touch gesture, swipe gesture, mouse input, or keyboard input, the model 402 may be rotated from a first orientation to a second orientation, to cause the interface 106(7) to present a view of a different portion of the model 402. For example, FIG. 4B depicts the seventh interface 106(7) presenting a view of the model 402 in a first orientation. In response to user input 124(6), such as a swipe gesture moving in a horizontal direction, the model 402 may be rotated in the direction of the user input 124(6). Subsequent to the user input 124(6), the seventh interface 106(7) may present the model 402 in a second orientation, which may cause different portions of the item represented by the model 402 to be visible. While FIG. 4B depicts a horizontal rotation of the model 402 in response to a user input 124(6) that indicates a horizontal direction, in other implementations, the model 402 may be rotated in vertical or diagonal directions.

FIG. 4B also illustrates an example in which user input 124(7) may be provided to the model 402 to change a level of magnification associated with the model 402. For example, a pinch-zoom touch gesture or an input using a scroll wheel of a mouse device may be used to change a zoom level associated with displayed content. Continuing the example, in response to user input 124(7), FIG. 4B depicts the interface 106(7) presenting the model 402 with an increased level of magnification. In some implementations, in response to user input 124(7) that increases a level of magnification or in response to presentation of a model 402 having at least a threshold level of magnification, presentation of other content, such as non-image content 118 or the additional images 114(F) may be ceased. In response to user input 124 that decreases the level of magnification to a threshold level, presentation of the other content may be resumed.

Figure 4C:
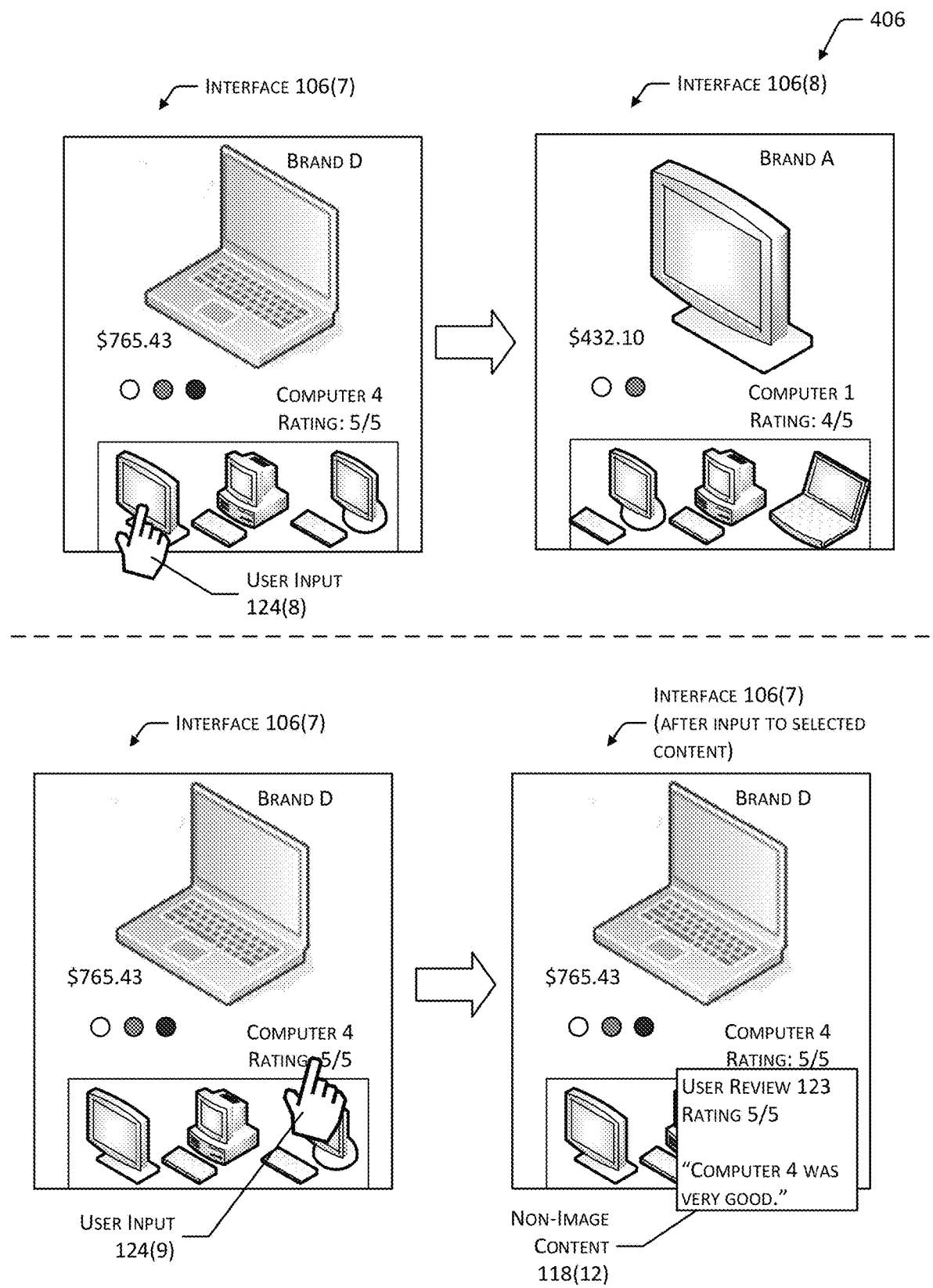
FIG. 4C is a series of diagrams depicting use of user input to select content presented in an interface to cause presentation of additional content.

FIG. 4C is a series of diagrams 406 depicting use of user input 124 to selected content presented in an interface 106(7) to cause presentation of additional content. As described with regard to FIG. 4A, in some implementations, the seventh interface 106(7) may present one or more additional images 114(F) that depict items related to the item represented by the model 402. User input 124(8) indicating a particular image 114(F) may cause presentation of an eighth interface 106(8) in which a model 402, or one or more images 114, that represent the item depicted in the selected image 114(F) are presented. Other non-image content 118 associated with the selected image 114(F), content controls 204, images 114 of related items, and so forth, may also be presented in the eighth interface 106(8).

In some implementations, user input 124(9) may be provided to non-image content 118 presented in the seventh interface 106(7). For example, FIG. 4C depicts user input 124(9) indicating a portion of non-image content 118 relating to ratings or reviews of the item represented by the model 402. In response to the user input 124(9), additional non-image content 118(12) may be presented in the seventh interface 106(7). For example, FIG. 4C depicts non-image content 118(12), such as text associated with a particular review of an item, presented in the seventh interface 106(7) as a frame. Other portions of the seventh interface 106(7) may be visible and accessible while the non-image content 118(12) is presented. For example, input to a portion of the seventh interface 106(7) outside of the frame may cause presentation of the non-image content 118(12) to cease.

Figure 4D:
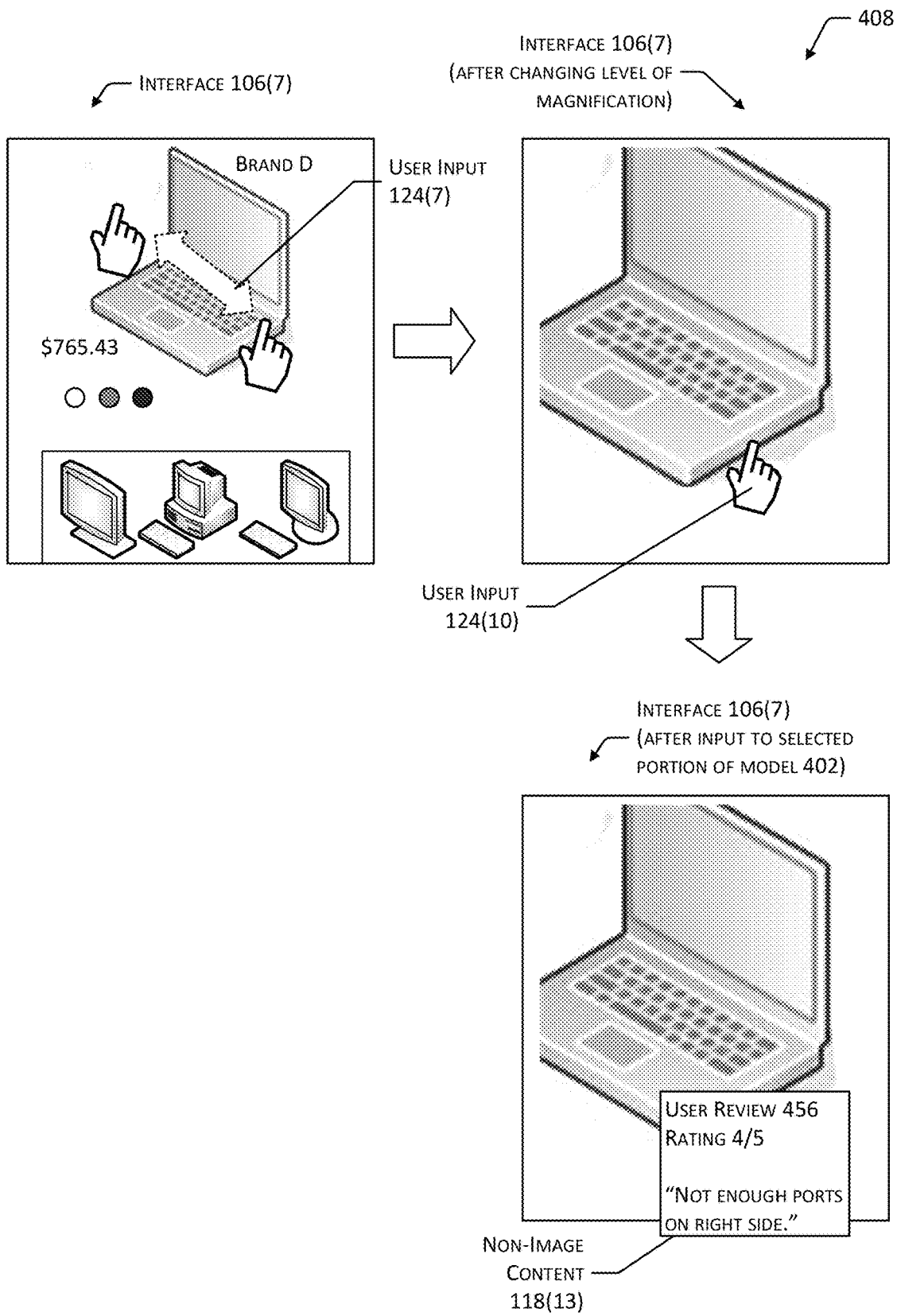
FIG. 4D is a diagram depicting use of user input to a particular portion of a model to cause presentation of content regarding the indicated portion of the model.

FIG. 4D is a diagram 408 depicting use of user input 124 to a particular portion of a model 402 to cause presentation of content regarding the indicated portion of the model 402. As described with regard to FIG. 4B, user input 124(7) provided to the model 402 may be used to change a level of magnification of the model 402. For example, FIG. 4D depicts user input 124(7), such as a multi-touch or pinch-zoom gesture, that may be used to cause a level of magnification of the model 402 to increase such that different portions of the model 402 may be visible in a display area of a user device 104. In some implementations, one or more portions of the model 402 may be configured to receive user input 124(10), in response to which additional content may be presented. For example, a portion of a model 402 corresponding to a screen, keyboard, case, or port of a laptop computer may be configured to receive user input 124(10), and in response to the user input 124(10), additional information regarding the particular portion of the item represented in the model 402 may be presented. Continuing the example, FIG. 4D depicts user input 124(10) provided to a right side of a depicted laptop computer after increasing a level of magnification of the model 402 such that the right side is visible. In response to the user input 124(10) to a particular portion of the model 402, non-image content 118(13), such as a user review or other text, that is specific to the portion of the model 402 to which the user input 124(10) was provided may be presented.

Figure 5:
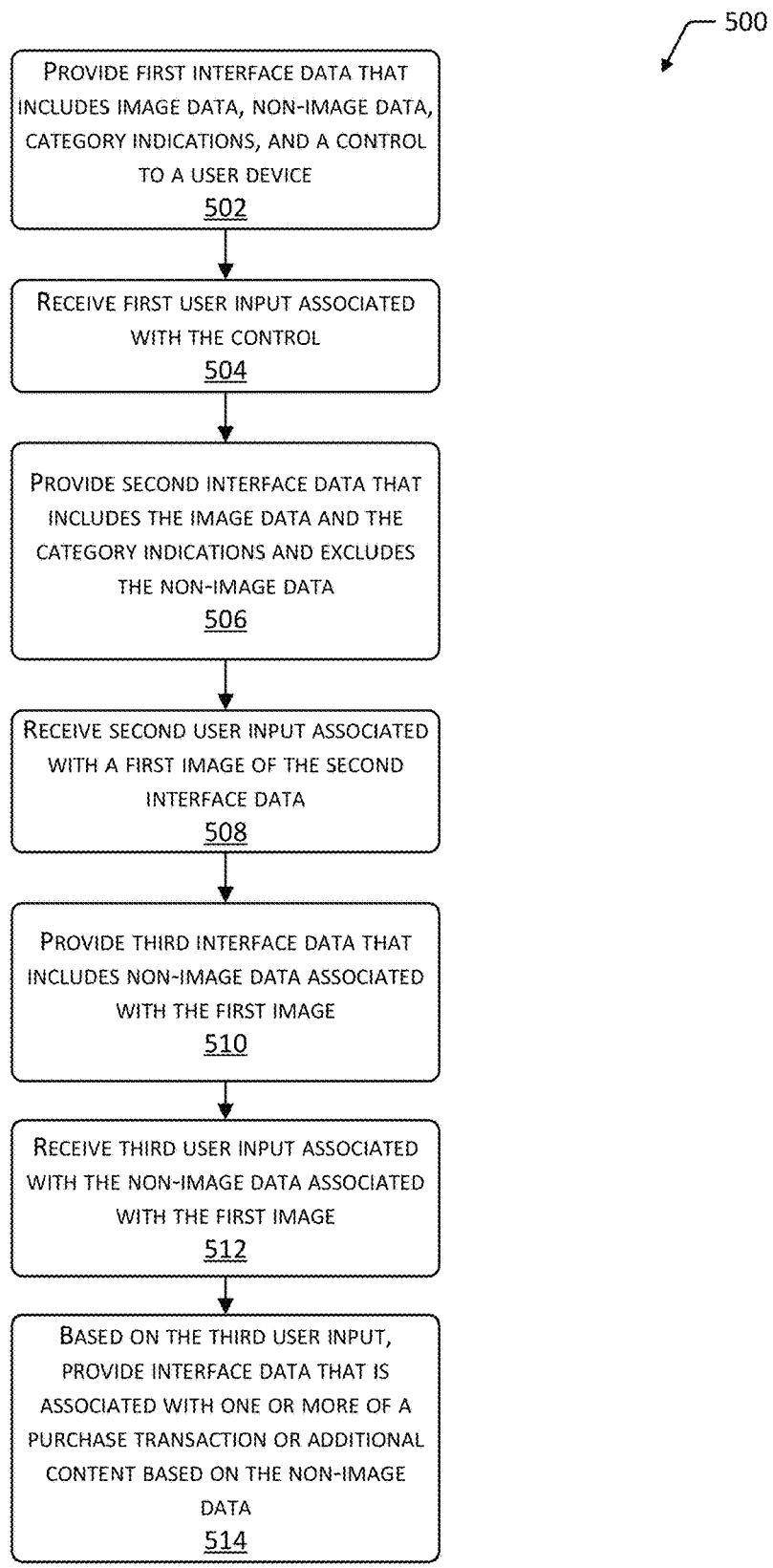
FIG. 5 is a flow diagram illustrating an implementation of a method for providing interface data in response to user input.

FIG. 5 is a flow diagram 500 illustrating an implementation of a method for providing interface data 102 in response to user input 124. At 502, first interface data 102(1) may be provided to a user device 104. The first interface data 102(1) may include image data 112, non-image data 116, category indications 206, and a control, such as an interface control 122(1). The first interface data 102(1) may be used to cause the user device 104 to present a first interface 106(1). For example, a first image 114(1) may be associated with first non-image content 118(1), such as text that describes an item represented by the first image 114(1). The first image 114(1) may also be associated with a first category indication 206(1), which may indicate a type or category associated with the represented item or with the first image 114(1). A second image 114(2) may be associated with second non-image content 118(2) and a second category indication 206(2). Any number of images 114 and non-image content 118 may be associated with the first category indication 206(1), the second category indication 206(2), or other category indications 206.

At 504, first user input 124(1) associated with the control may be received. For example, an interface control 122(1) may be used to cause presentation of a second interface 106(2) that prioritizes presentation of images 114. The interface control 122(1) may include a switch, button, or other type of control. In some implementations, the interface control 122(1) may be associated with text, a graphic, or other content indicating that user input 124(1) to the interface control 122(1) may be associated with presentation of the second interface 106(2) that prioritizes presentation of images 114.

At 506, second interface data 102(2) that includes at least a portion of the image data 112 and the category indications 206 of the first interface data 102(1) and excludes at least a portion of the non-image data 116 may be provided to the user device 104. In some implementations, the second interface data 102(2) may be determined in response to the user input 124(1). For example, determining the second interface data 102(2) after the user input 124(1) is received may avoid consuming computational resources associated with determining the second interface data 102(2) until user input 124(1) indicating an intent to view a second interface 106(2) is determined. In other implementations, the second interface data 102(2) may include previously-generated data that may be sent to a user device 104 in response to the user input 124(1). For example, determining the second interface data 102(2) prior to receiving the user input 124(1) may reduce latency perceived by a user that may be associated with determining the second interface data 102(2). The second interface data 102(2) may cause presentation of a second interface 106(2). The second interface 106(2) may associate each image 114 with the corresponding category indication 206 of the first interface 106(1), but may exclude at least a portion of the non-image content 118 to enable a larger number of images 114 to be viewed in a display area.

At 508, second user input 124(2) associated with a first image 114(1) of the second interface data 102(2) may be received. For example, user input 124(2), such as a touch gesture, mouse input, or keyboard input, may select or otherwise indicate a particular image 114(1) presented in the second interface 106(2).

At 510, third interface data 102(3) that includes non-image data 116(1) associated with the first image 114(1) may be provided to the user device 104. The third interface data 102(3) may include the non-image data 116(1) that was associated with the first image 114(1) and in some implementations, may include additional image data 112 or non-image data 116. The third interface data 102(3) may cause the user device 104 to present a third interface 106(3).

At 512, third user input 124(3) associated with the non-image data 116 associated with the first image 114(1) may be received. For example, user input 124(3) may be provided to a navigational link, button, control, image 114, or other content presented in the third interface 106(3), which may cause navigation to a subsequent interface 106 or performance of one or more functions.

For example, at 514, based on the third user input 124(3), interface data 102 associated with one or more of a purchase transaction or additional content based on the indicated non-image data 116 may be provided to the user device 104. Continuing the example, user input 124(3) to a control or other content may be used to purchase a depicted item or to navigate to a subsequent interface data 102 that may be used to acquire additional information or to purchase the item. In some implementations, data associated with the purchase transaction or additional content may be determined when the third interface data 102(3) is determined. Determining this data before the third user input 124(3) is received may reduce the latency perceived by a user, while determining the data after the third interface 106(3) is presented may avoid consuming computational resources to determine data that is unlikely to be accessed by the user.

Figure 6:
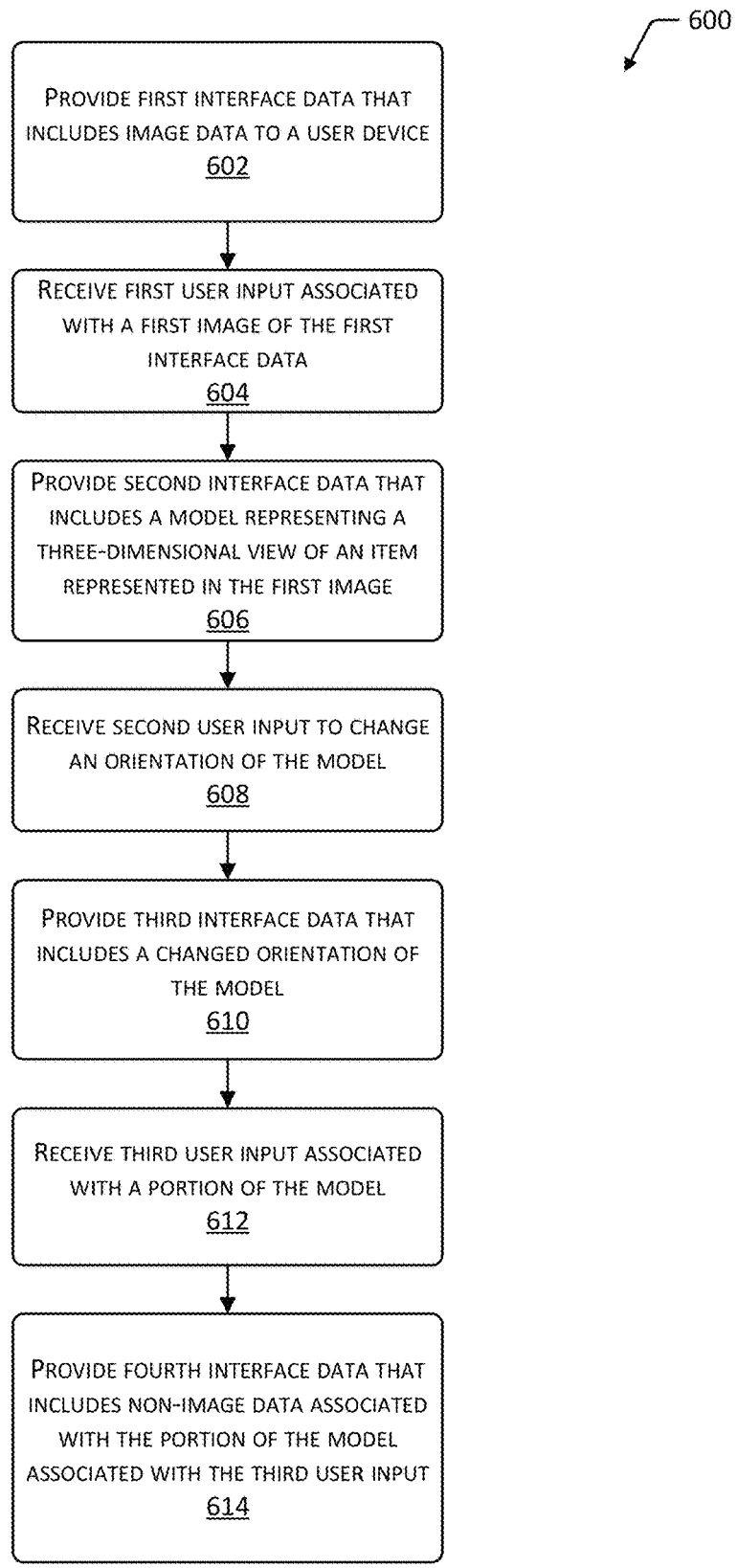
FIG. 6 is a flow diagram illustrating an implementation of a method for providing interface data for presenting a model and receiving user input interacting with the model.

FIG. 6 is a flow diagram 600 illustrating an implementation of a method for providing interface data 102 for presenting a model 402 and receiving user input 124 interacting with the model 402. At 602, first interface data 102(1) that includes image data 112 may be provided to a user device 104. The first interface data 102(1) may also include non-image data 116, category indications 206, and so forth. The first interface data 102(1) may cause the user device 104 to present a first interface 106(1) that includes one or more images 114 based on the image data 112.

At 604, first user input 124(1) associated with a first image 114(1) of the first interface data 102(1) may be received. For example, a user may provide input selecting or otherwise indicating a particular image 114(1) presented in the first interface 106(1), and data indicative of the user input 124(1) may be provided to one or more servers 110 or other computing device(s) associated with the interface data 102.

At 606, second interface data 102(2) that includes a model 402 representing a three-dimensional view of an item represented in the first image 114(1) may be provided to the user device 104. As described with regard to FIGS. 4A-4D, in some implementations, the model 402 may be generated based on a plurality of images 114 associated with the item. In other implementations, the model 402 may include an existing three-dimensional representation of the item. The second interface data 102(2) may cause presentation of a second interface 106(2) that includes the model 402. In some implementations, the second interface 106(2) may be presented as a frame within the first interface 106(1). In other implementations, the model 402 may be presented simultaneously with the first interface 106(1), such as in a foreground while the first interface 106(1) remains in a background. For example, as shown in FIG. 4A, portions of an underlying interface 106 may be visible behind a presented model 402.

At 608, second user input 124(2) may be received to change an orientation of the model 402. For example, as described with regard to FIG. 4B, a touch or swipe gesture or a mouse movement may be used to cause a perceived rotation of the model 402 in a direction associated with the user input 124(2), or a level of magnification of the model may be changed. Based on the direction and distance associated with the user input 124(2) or the type of user input 124(2) provided to the model 402 in a first orientation, a second orientation of the model 402 may be determined. For example, the second orientation may include a larger level of magnification than the first orientation.

At 610, third interface data 102(3) that includes a changed orientation of the model 402 may be provided to the user device 104. Based on the third interface data 102(3), the user device 104 may present a third interface 106(3) that presents the model 402 in the changed orientation.

At 612, third user input 124(3) associated with a portion of the model 402 may be received. For example, the third user input 124(3) may include an indication of a particular part of an item represented by the model 402. The portion of the item that corresponds to the portion of the model 402 to which the third user input 124(3) was received may be determined in response to the third user input 124(3).

At 614, fourth interface data 102(4) that includes non-image data 116 associated with the portion of the model 402 associated with the third user input 124(3) may be provided to the user device 104. For example, the fourth interface data 102(4) may cause presentation of non-image content 118 describing the portion of the item that corresponds to the selected portion of the model 402. Continuing the example, the non-image content 118 may include a description, review, or in some cases, additional images 114 associated with a particular portion of an item. In some implementations, the fourth interface data 102(4) may be determined in response to the second user input 124(2). For example, in response to user input 124(2) that increases a level of magnification of a model 402 or changes an orientation of the model 402 such that a particular portion of the model 402 is visible, fourth interface data 102(4) that includes information regarding the particular portion of the model 402 may be determined.

Figure 7:
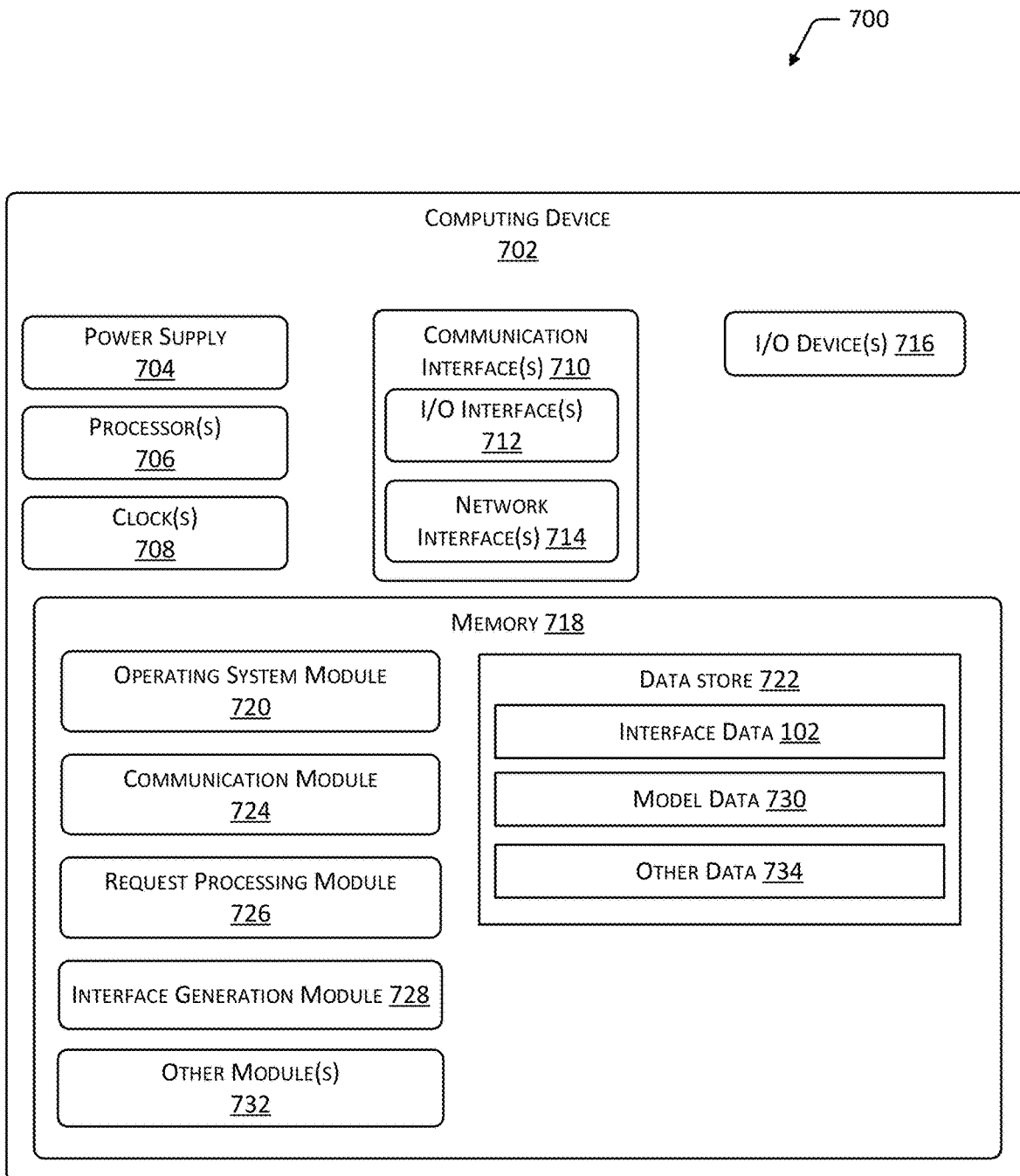
FIG. 7 is a block diagram illustrating an implementation of a computing device within the present disclosure.

FIG. 7 is a block diagram 700 illustrating an implementation of a computing device 702 within the present disclosure. The computing device 702 may include a server 110, user device 104, or any other computing device 702 in communication with a user device 104. Additionally, while FIG. 7 depicts a single block diagram 700 of a computing device 702, any number and any type of computing devices 702 may be used to perform the functions described herein.

One or more power supplies 704 may be configured to provide electrical power suitable for operating the components of the computing device 702. In some implementations, the power supply 704 may include a rechargeable battery, fuel cell, photovoltaic cell, power conditioning circuitry, and so forth.

The computing device 702 may include one or more hardware processor(s) 706 (processors) configured to execute one or more stored instructions. The processor(s) 706 may include one or more cores. One or more clock(s) 708 may provide information indicative of date, time, ticks, and so forth. For example, the processor(s) 706 may use data from the clock 708 to generate a timestamp, trigger a preprogrammed action, and so forth.

The computing device 702 may include one or more communication interfaces 710, such as input/output (I/O) interfaces 712, network interfaces 714, and so forth. The communication interfaces 710 may enable the computing device 702, or components of the computing device 702, to communicate with other computing devices 702 or components of the other computing devices 702. The I/O interfaces 712 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 712 may couple to one or more I/O devices 716. The I/O devices 716 may include any manner of input devices or output devices associated with the computing device 702. For example, I/O devices 716 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 716 may be physically incorporated with the computing device 702. In other implementations, the I/O devices 716 may be externally placed. The I/O devices 716 may also include one or more sensors, that may be in direct or wireless communication with the computing device 702.

The network interfaces 714 may be configured to provide communications between the computing device 702 and other devices, such as the I/O devices 716, routers, access points, and so forth. The network interfaces 714 may include devices configured to couple to one or more networks including local area networks (LANs), wireless LANs (WLANs), wide area networks (WANs), wireless WANs, and so forth. For example, the network interfaces 714 may include devices compatible with Ethernet, Wi-Fi, Bluetooth, ZigBee, Z-Wave, 3G, 4G, 5G, LTE, and so forth.

The computing device 702 may include one or more busses or other internal communications hardware or software that allows for the transfer of data between the various modules and components of the computing device 702.

As shown in FIG. 7, the computing device 702 may include one or more memories 718. The memory 718 may include one or more computer-readable storage media (CRSM). The CRSM may be any one or more of an electronic storage medium, a magnetic storage medium, an optical storage medium, a quantum storage medium, a mechanical computer storage medium, and so forth. The memory 718 may provide storage of computer-readable instructions, data structures, program modules, and other data for the operation of the computing device 702. A few example modules are shown stored in the memory 718, although the same functionality may alternatively be implemented in hardware, firmware, or as a system on a chip (SoC).

The memory 718 may include one or more operating system (OS) modules 720. The OS module 720 may be configured to manage hardware resource devices such as the I/O interfaces 712, the network interfaces 714, the I/O devices 716, and to provide various services to applications or modules executing on the processors 706. The OS module 720 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 722 and one or more of the following modules may also be associated with the memory 718. The modules may be executed as foreground applications, background tasks, daemons, and so forth. The data store(s) 722 may use a flat file, database, linked list, tree, executable code, script, or other data structure to store information. In some implementations, the data store(s) 722 or a portion of the data store(s) 722 may be distributed across one or more other devices including other computing devices 702, network attached storage devices, and so forth.

A communication module 724 may be configured to establish communications with one or more other computing devices 702. Communications may be authenticated, encrypted, and so forth.

The memory 718 may also store a request processing module 726. The request processing module 726 may receive user input 124, such as input to navigational controls 126, interface controls 122, content controls 204, and so forth. The request processing module 726 may determine one or more functions, commands, or data associated with the user input 124 and may cause the performance of one or more operations in response to the user input 124. For example, in response to user input 124, the request processing module 726 may cause interface data 102 to be generated or retrieved and provided to a source of the user input 124. As another example, the request processing module 726 may determine a portion of an interface 106 associated with user input 124, such as a particular image 114 or portion of a model 402 that was selected.

The memory 718 may additionally store an interface generation module 728. The interface generation module 728 may determine interface data 102 based on user input 124. For example, the interface generation module 728 may determine image data 112 and non-image data 116 that corresponds to a search query or to portions of an interface 106 to which user input 124 was received. In some cases, the interface generation module 728 may determine content for inclusion in interface data 102, such as content associated with items related to a particular item depicted in an image 114. In some implementations, the interface generation module 728 may generate or determine model data 730, which may be used to cause presentation of a model 402 representing an item.

Other modules 732 may also be present in the memory 718. For example, other modules 732 may include permission or authorization modules to enable a user to provide authorization to send and receive data associated with the computing device 702. Other modules 732 may also include encryption modules to encrypt and decrypt communications between computing devices 702, authentication modules to authenticate communications sent or received by computing devices 702, a permission module to assign, determine, and manage user permissions to access or modify data associated with computing devices 702, and so forth. Other modules 732 may include modules for presenting interfaces 106 based on interface data 102, modifying presentation of interfaces 102 based on user configurations or preferences, and so forth.

Other data 734 within the data store(s) 722 may include configurations, settings, preferences, and default values associated with computing devices 702. Other data 734 may also include encryption keys and schema, access credentials, and so forth.

In different implementations, different computing devices 702 may have different capabilities or capacities. For example, servers 110 may have greater processing capabilities or data storage capacity than user devices 104.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Further-more, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
access first interface data that includes: a first image associated with a first category, first text associated with the first image, a second image associated with a second category, second text associated with the second image, and a control for requesting second interface data, wherein the first interface data causes presentation of a first interface that presents the first image in association with the first text and a first indication of the first category, and the second image in association with the second text and a second indication of the second category;
provide the first interface data to a user device;
receive first user input associated with the control;
generate the second interface data based on the first interface data, wherein the second interface data causes presentation of a second interface that presents the first image in association with the first indication of the first category and the second image in association with the second indication of the second category, and excludes presentation of the first text and the second text;
provide the second interface data to the user device;
receive second user input associated with the first image; and
in response to the second user input, provide third interface data to the user device, wherein the third interface data includes at least a portion of the first text.

2. The system of claim 1, wherein the first image is associated with an item, the system further comprising computer-executable instructions to:
determine a model representing a three-dimensional view of the item based on a plurality of images associated with the item;
include the model in the third interface data, wherein the third interface data causes presentation of the model in a first orientation;
receive third user input associated with the model; and
in response to the third user input, one or more of rotate the model or change a level of magnification associated with the model to cause presentation of the model in a second orientation.

3. The system of claim 1, further comprising computer-executable instructions to:
based on the third interface data, cause presentation of a third interface within a frame presented with the second interface, wherein at least a portion of the second interface is visible during presentation of the third interface, and input to the at least a portion of the second interface causes navigation to the second interface.

4. A method comprising:
determining first interface data that includes: a first image, first non-image data associated with the first image, and a first indication of a first category associated with the first image, wherein the first interface data causes presentation of a first interface that presents the first image in association with the first non-image data and the first indication;
generating second interface data based on the first interface data, wherein the second interface data causes presentation of a second interface that presents the first image in association with the first indication and excludes presentation of the first non-image data; and
generating third interface data based on the first interface data, wherein the third interface data causes presentation of at least a portion of the first non-image data in response to first user input indicating the first image.

5. The method of claim 4, further comprising:
receiving second user input to cause scrolling of the first image; and
in response to the second user input, moving the first image relative to the first indication of the first category, wherein the first indication of the first category is maintained in a stationary orientation within the second interface.

6. The method of claim 4, wherein the first interface data further includes a second image associated with a second category, the method further comprising:
generating the second interface data to further cause presentation of the second image in association with a second indication of the second category.

7. The method of claim 4, wherein the first interface data further includes a second image associated with a second category and second non-image data, the method further comprising:
  generating the second interface data to further cause presentation of the second image in association with a second indication of the second category, and to cause presentation of a control associated with the second category for requesting the first interface data;
  receiving second user input associated with the control; and
  in response to the second user input, causing presentation of at least a portion of the second non-image data in association with the second indication of the second category.

8. The method of claim 4, further comprising:
  providing the first interface data to a user device, wherein the first interface data causes presentation of a control for selecting presentation of images;
  receiving, from the user device, second user input indicative of the control; and
  providing the second interface data to the user device, wherein the second interface data causes the presentation of the first image.

9. The method of claim 4, further comprising:
  receiving the first user input indicating the first image; and
  in response to the first user input and based on the third interface data, presenting the at least a portion of the first non-image data within a frame presented with the second interface, wherein at least a portion of the second interface is external to the frame and input to the at least a portion of the second interface causes navigation to the second interface.

10. The method of claim 4, wherein the third interface data further includes a model representing a three-dimensional view of an item, the method further comprising:
  receiving the first user input indicating the first image;
  in response to the first user input and based on the third interface data, presenting the model in a first orientation;
  receiving second user input associated with the model; and
  in response to the second user input, one or more of rotating the model or changing a level of magnification associated with the model to cause presentation of the model in a second orientation.

11. The method of claim 4, wherein first image is associated with a first item, the method further comprising:
  determining a second item related to the first item;
  determining a second image that represents the second item;
  including the second image in the third interface data;
  receiving second user input indicative of the second image;
  determining fourth interface data that includes one or more of: the second image, a third image representing the second item, or second non-image data associated with the second item; and
  causing presentation of a third interface based on the fourth interface data.

12. The method of claim 4, wherein the first image is associated with a first item, the method further comprising:
  receiving the first user input indicating the first image;
  in response to the first user input, determining second non-image data associated with the first item; and
  causing presentation of an interface that includes the at least a portion of the first non-image data and at least a portion of the second non-image data.

13. A system comprising:
  one or more memories storing computer-executable instructions; and
  one or more hardware processors to execute the computer-executable instructions to:
    determine a model representing a three-dimensional view of a first item based on a plurality of images associated with the first item;
    receive first user input indicative of the first item presented in a first interface;
    in response to the first user input, cause presentation of the model in a first orientation, wherein at least a portion of the first interface is visible during presentation of the model;
    receive second user input associated with the model; and
    in response to the second user input, one or more of rotate the model or change a level of magnification associated with the model to cause presentation of the model in a second orientation.

14. The system of claim 13, further comprising computer-executable instructions to:
  determine first non-image data associated with the first item;
  determine a first region of a second interface presenting the model that includes the model;
  determine a second region of the second interface that differs from the first region; and
  cause presentation of at least a portion of the first non-image data in the second region of the second interface.

15. The system of claim 13, further comprising computer-executable instructions to:
  determine first non-image data associated with the first item;
  cause presentation of the first non-image data in association with the model;
  determine that the second user input is associated with increasing the level of magnification associated with the model; and
  in response to the second user input, cease presentation of the first non-image data.

16. The system of claim 13, further comprising computer-executable instructions to:
  determine third user input associated with a region of the model;
  determine a portion of the first item associated with the region of the model;
  determine one or more of first non-image data or a first image that is associated with the portion of the first item; and
  cause presentation of the one or more of the first non-image data or the first image in response to the third user input.

17. The system of claim 13, further comprising computer-executable instructions to:
  cause presentation of a navigational link associated with the first item in a second interface in which the model is presented;
  receive third user input associated with the navigational link; and
  in response to the third user input, present a third interface that includes one or more of first non-image data associated with the first item or a first image representing the first item, wherein the third interface further includes a control to initiate a purchase transaction associated with the first item.

18. The system of claim 13, further comprising computer-executable instructions to:
   determine a second item associated with the first item;
   determine a first image that represents the second item;
   cause presentation of the first image adjacent to the model;
   receive third user input indicative of the first image; and
   in response to the third user input, cause presentation of one or more of non-image data associated with the second item or a second image associated with the second item.

19. The system of claim 13, further comprising computer-executable instructions to:
   cause presentation of the model within a frame presented with the first interface, wherein at least a portion of the first interface is accessible in response to third user input external to the frame.

20. The system of claim 13, further comprising computer-executable instructions to:
   cause presentation of a control for selecting a characteristic of the first item adjacent to the model;
   receive third user input associated with the control; and
   in response to the third user input, modify the model to present the characteristic associated with the third user input.

* * * * *

UNITED STATES PATENT AND TRADEMARK OFFICE
CERTIFICATE OF CORRECTION

PATENT NO. : 11,200,740 B1
APPLICATION NO. : 17/012632
DATED : December 14, 2021
INVENTOR(S) : Sunil Samuel Page 1 of 1

It is certified that error appears in the above-identified patent and that said Letters Patent is hereby corrected as shown below:

In the Claims

Column 27, Claim 11, Line 47:
Delete: "The method of claim 4, wherein first image is"
Insert: --The method of claim 4, wherein the first image is--

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*